(12) United States Patent
Hasenplaugh et al.

(10) Patent No.: US 10,379,855 B2
(45) Date of Patent: Aug. 13, 2019

(54) PROCESSORS, METHODS, SYSTEMS, AND INSTRUCTIONS TO LOAD MULTIPLE DATA ELEMENTS TO DESTINATION STORAGE LOCATIONS OTHER THAN PACKED DATA REGISTERS

(71) Applicant: Intel Corporation, Santa Clara, CA (US)

(72) Inventors: William C. Hasenplaugh, Boston, MA (US); Chris J. Newburn, South Beloit, IL (US); Simon C. Steely, Jr., Hudson, NH (US); Samantika S. Sury, Westford, MA (US)

(73) Assignee: Intel Corporation, Santa Clara, CA (US)

( * ) Notice: Subject to any disclaimer, the term of this patent is extended or adjusted under 35 U.S.C. 154(b) by 7 days.

(21) Appl. No.: 15/283,259

(22) Filed: Sep. 30, 2016

(65) Prior Publication Data

US 2018/0095756 A1 Apr. 5, 2018

(51) Int. Cl.
*G06F 9/312* (2018.01)
*G06F 12/00* (2006.01)
(Continued)

(52) U.S. Cl.
CPC ........ *G06F 9/30032* (2013.01); *G06F 9/3004* (2013.01); *G06F 9/3013* (2013.01);
(Continued)

(58) Field of Classification Search
CPC ............. G06F 9/30018; G06F 9/30032; G06F 9/30036; G06F 9/3004; G06F 9/30043;
(Continued)

(56) References Cited

U.S. PATENT DOCUMENTS 6,275,904 B1 * 8/2001 Chennupaty ........ G06F 9/30018
711/122
2009/0172359 A1 7/2009 Shen et al.
(Continued)

OTHER PUBLICATIONS

Chrysos, George, "Intel® Xeon Phi™ Coprocessor (codename Knights Corner)", published on Aug. 28, 2012, 31 Pages.
(Continued)

*Primary Examiner* — Daniel H Pan
(74) *Attorney, Agent, or Firm* — Nicholson De Vos Webster & Elliott, LLP

(57) ABSTRACT

A processor of an aspect includes a plurality of packed data registers, and a decode unit to decode an instruction. The instruction is to indicate a packed data register of the plurality of packed data registers that is to store a source packed memory address information. The source packed memory address information is to include a plurality of memory address information data elements. An execution unit is coupled with the decode unit and the plurality of packed data registers, the execution unit, in response to the instruction, is to load a plurality of data elements from a plurality of memory addresses that are each to correspond to a different one of the plurality of memory address information data elements, and store the plurality of loaded data elements in a destination storage location. The destination storage location does not include a register of the plurality of packed data registers.

23 Claims, 23 Drawing Sheets

(51) Int. Cl.
*G06F 9/30* (2018.01)
*G06F 12/1045* (2016.01)
*G06F 12/0886* (2016.01)
*G06F 12/0897* (2016.01)
*G06F 12/126* (2016.01)
*G06F 12/1027* (2016.01)

(52) U.S. Cl.
CPC ........ *G06F 9/3016* (2013.01); *G06F 9/30036* (2013.01); *G06F 9/30043* (2013.01); *G06F 12/0886* (2013.01); *G06F 12/0897* (2013.01); *G06F 12/1054* (2013.01); *G06F 12/126* (2013.01); *G06F 12/1027* (2013.01); *G06F 2212/1024* (2013.01); *G06F 2212/1028* (2013.01); *G06F 2212/681* (2013.01)

(58) Field of Classification Search
CPC .. G06F 9/30047; G06F 9/3885; G06F 9/3887; G06F 12/1054; G06F 12/12; G06F 12/121; G06F 12/122; G06F 12/123; G06F 12/1027; G06F 15/8007; G06F 15/70053; G06F 9/3013; G06F 9/3016; G06F 12/0886; G06F 12/0897; G06F 12/126; G06F 2212/1024; G06F 2212/1028; G06F 2212/681
USPC .................. 712/4, 5, 22, 23, 223, 224, 225; 711/133, 205, 206, 207
See application file for complete search history.

(56) References Cited

U.S. PATENT DOCUMENTS

| | | |
|---|---|---|
| 2012/0137074 A1 | 5/2012 | Kim et al. |
| 2014/0095779 A1 | 4/2014 | Forsyth et al. |
| 2014/0108862 A1* | 4/2014 | Rafacz ................. G06F 9/3826 714/15 |
| 2014/0181482 A1 | 6/2014 | Smaus et al. |
| 2015/0095623 A1* | 4/2015 | Ermolaev ........... G06F 9/30036 712/222 |
| 2016/0019184 A1 | 1/2016 | Hughes |
| 2016/0246723 A1 | 8/2016 | Doshi et al. |

OTHER PUBLICATIONS

Coleman, et al., "Processors, Methods, Systems, and Instructions to Fetch Data to Indicated Cache Level With Guaranteed Completion", U.S. Appl. No. 15/088,327, filed Apr. 1, 2016, 65 pages.
Sodani, Avinash "Knights Landing (KNL): 2nd Generation Intel® Xeon Phi™ Processor", 2015, published prior to Sep. 30, 2015, 24 Pages.
Austin T.M., et al., "High-Bandwidth Address Translation for Multiple-Issue Processors," Proceedings of the 23rd Annual International Symposium on Computer Architecture, May 22-24, 1996, pp. 158-167.
International Search Report and Written Opinion for Application No. PCT/US2017/049328, dated Jun. 4, 2018, 15 pages.
International Preliminary Report on Patentability for Application No. PCT/US2017/049328, dated Apr. 11, 2019, 12 pages.

* cited by examiner

FIG. 2

METHOD OF
PERFORMING INDEXED
LOAD INSTRUCTION
230

RECEIVE INDEXED LOAD INSTRUCTION INDICATING PACKED DATA REGISTER THAT STORES SOURCE PACKED MEMORY ADDRESS INFORMATION THAT INCLUDES MEMORY ADDRESS INFORMATION DATA ELEMENTS — 231

LOAD DATA ELEMENTS FROM MEMORY ADDRESSES THAT EACH CORRESPOND TO A DIFFERENT ONE OF MEMORY ADDRESS INFORMATION DATA ELEMENTS, IN RESPONSE TO THE INSTRUCTION — 232

STORE LOADED DATA ELEMENTS IN DESTINATION STORAGE LOCATION IN RESPONSE TO INSTRUCTION, WHERE DESTINATION STORAGE LOCATION DOES NOT INCLUDE PACKED DATA REGISTER — 233

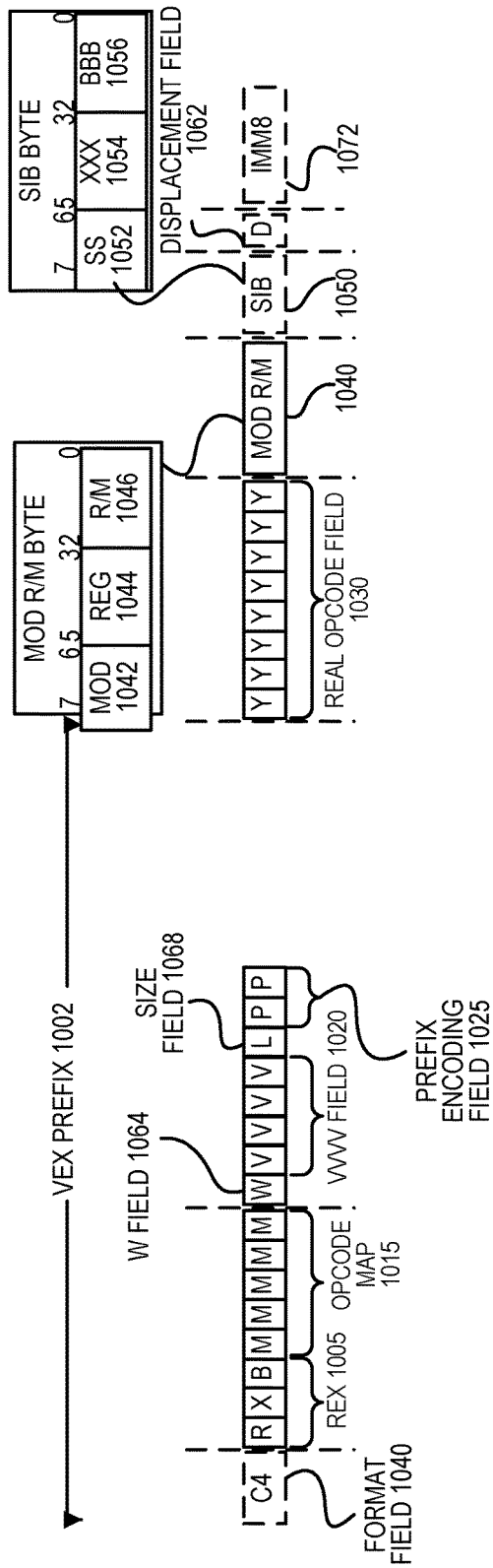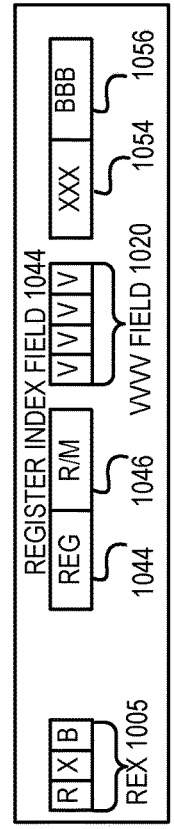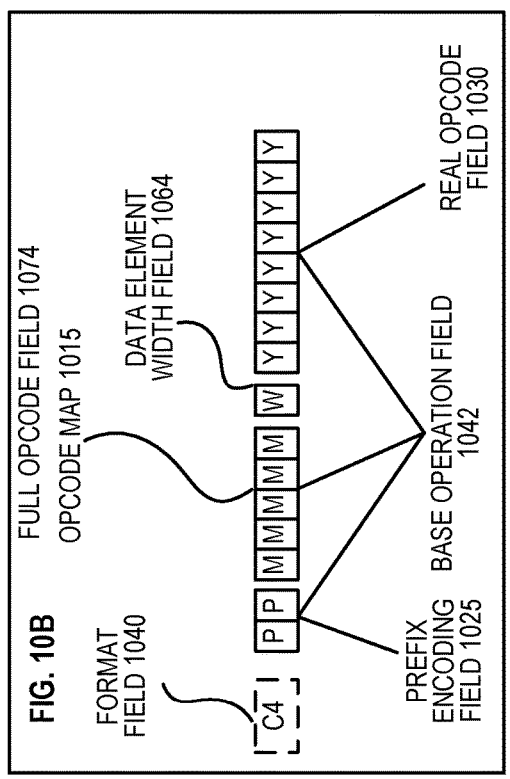

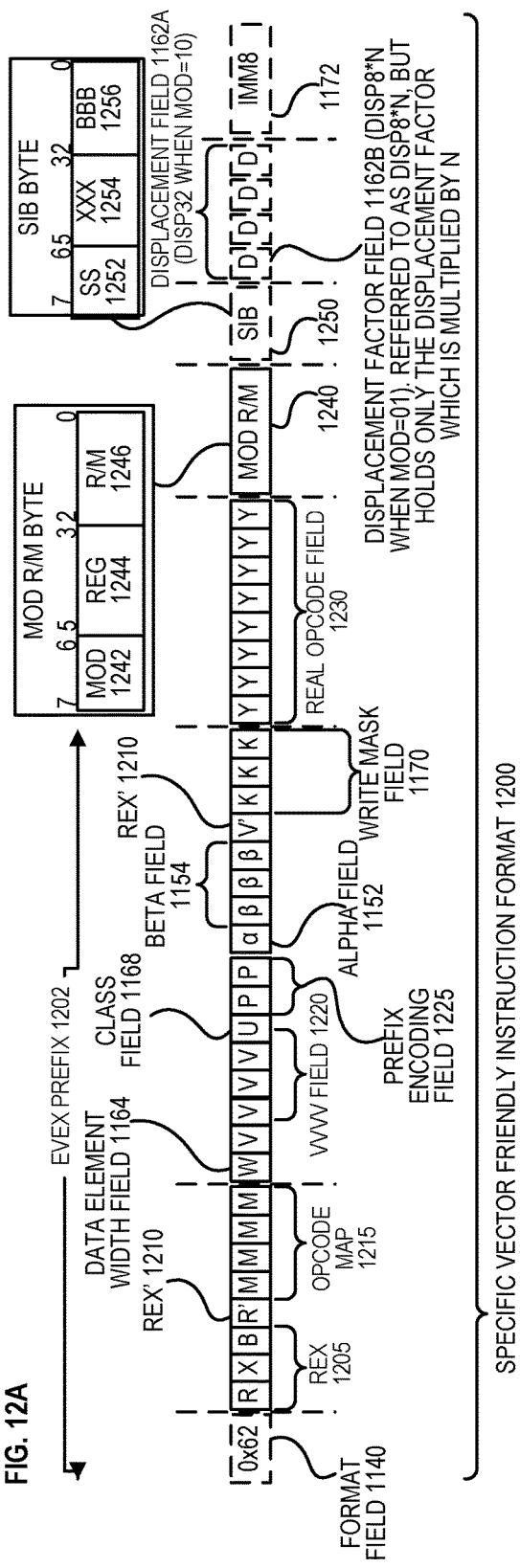
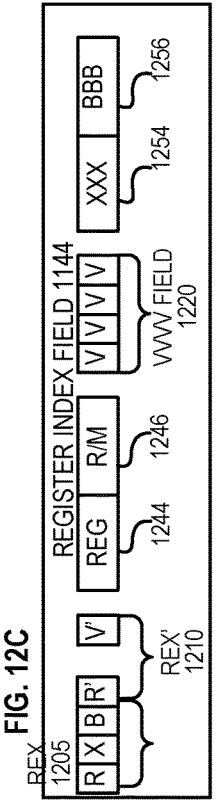
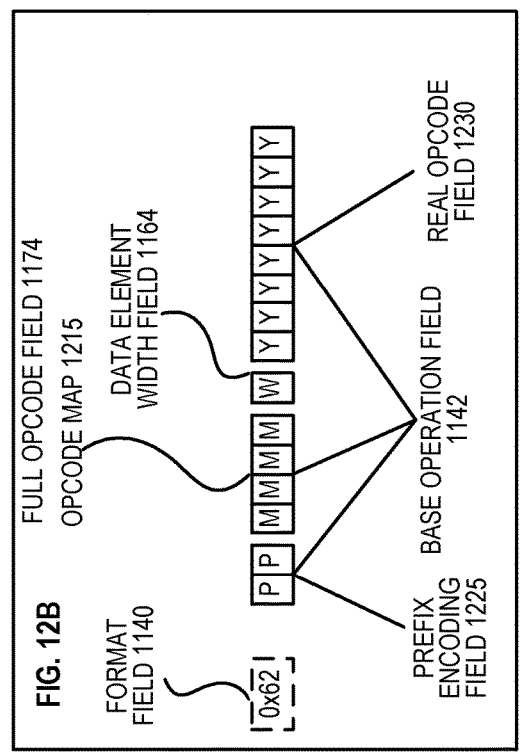

US 10,379,855 B2

PROCESSORS, METHODS, SYSTEMS, AND INSTRUCTIONS TO LOAD MULTIPLE DATA ELEMENTS TO DESTINATION STORAGE LOCATIONS OTHER THAN PACKED DATA REGISTERS

STATEMENT OF GOVERNMENT INTEREST

This invention was made with Government support under contract number H98230-13-D-0124 awarded by the Department of Defense. The Government has certain rights in this invention.

BACKGROUND

Technical Field

Embodiments described herein generally relate to processors. In particular, embodiments described herein generally relate to memory access capabilities of processors.

Background Information

Processors commonly perform instructions to access memory. For example, processors may execute load instructions to read or load data from memory and/or store instructions to write or store data to memory.

For at least some applications and uses, the ability to load data quickly from memory may significantly affect performance. For example, this may commonly be the case for various different types of memory access intensive applications.

BRIEF DESCRIPTION OF THE DRAWINGS

The invention may best be understood by referring to the following description and accompanying drawings that are used to illustrate embodiments. In the drawings:

FIG. 2 is a block flow diagram of an embodiment of a method of performing an embodiment of an indexed load instruction with a destination storage location that is not a packed data register.

FIGS. 10A-10C are block diagrams illustrating a generic vector friendly instruction format and instruction templates thereof, according to embodiments of the invention.

FIG. 12A-D is a block diagram illustrating an exemplary specific vector friendly instruction format and fields thereof, according to embodiments of the invention.

DETAILED DESCRIPTION OF EMBODIMENTS

Disclosed herein are embodiments of instructions, embodiments of processors to perform the instructions, embodiments of methods performed by the processors when performing the instructions, embodiments of systems incorporating one or more processors to perform the instructions, and embodiments of programs or machine-readable mediums providing the instructions. In some embodiments, the processors may have logic to perform the instructions (e.g., a decode unit, other unit, or other logic to decode the instruction, and a memory access unit, other execution unit, other unit, or other logic to execute or perform the instruction). In the following description, numerous specific details are set forth (e.g., specific instruction operations, sequences of operations, memory ordering semantics, processor configurations, micro-architectural details, etc.). However, embodiments may be practiced without these specific details. In other instances, well-known circuits, structures and techniques have not been shown in detail to avoid obscuring the understanding of the description.

Figure 1:
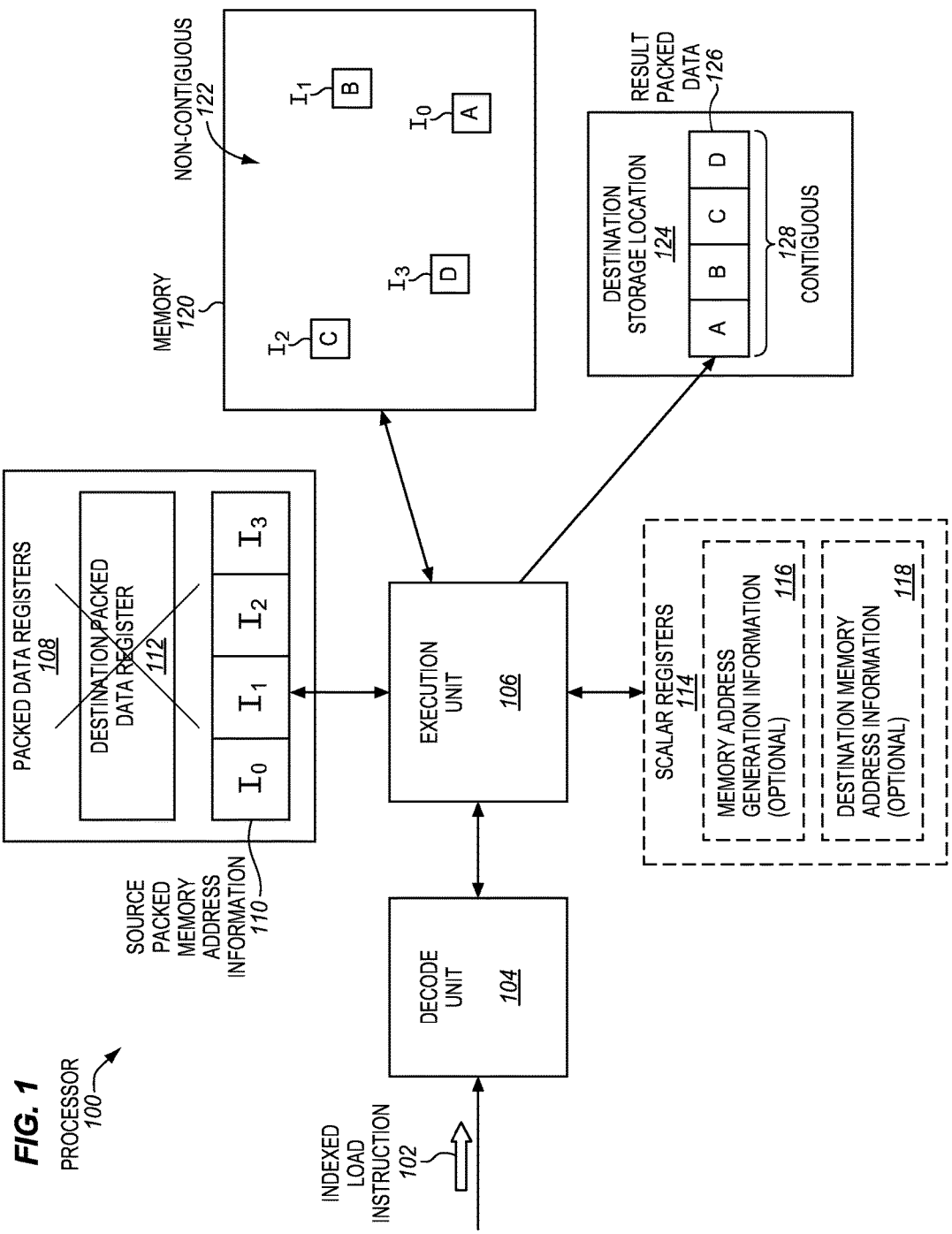
FIG. 1 is a block diagram of an embodiment of a processor that is operative to perform an embodiment of an indexed load instruction with a destination storage location that is not in a set of packed data registers.

FIG. 1 is a block diagram of an embodiment of a processor 100 that is operative to perform an embodiment of an indexed load instruction 102 with a destination storage location 124 that is not an architectural register. In some embodiments, the processor may be a general-purpose processor (e.g., a general-purpose microprocessor or central processing unit (CPU) of the type used in desktop, laptop, server, and other computer systems). Alternatively, the processor may be a special-purpose processor. Examples of suitable special-purpose processors include, but are not limited to, network processors, communications processors, cryptographic processors, graphics processors, co-processors, embedded processors, and digital signal processors (DSPs). The processor may have any of various complex instruction set computing (CISC) architectures, reduced instruction set computing (RISC) architectures, very long instruction word (VLIW) architectures, hybrid architectures, other types of architectures, or have a combination of different architectures (e.g., different cores may have different architectures). In some embodiments, the processor may be disposed on at least one integrated circuit or semiconductor die. In some embodiments, the processor may include at least some hardware (e.g., transistors, circuitry, non-volatile memory storing microcode, or the like).

During operation, the processor 100 may fetch or otherwise receive the indexed load instruction 102. One example of the indexed load instruction is a gather instruction. The instruction may represent a macroinstruction, machine language instruction, or other instruction or control signal of an instruction set of the processor.

In some embodiments, the indexed load instruction 102 may explicitly specify (e.g., through one or more fields or sets of bits), or otherwise indicate (e.g., implicitly indicate), a source packed memory address information 110. As shown, in some embodiments, the source packed memory address information may optionally include a plurality of packed memory indices (e.g., I0, I1, I2, and I3). Similarly, in some embodiments, the indexed load instruction may optionally explicitly specify or otherwise indicate optional additional memory address generation information 116 that is to be combined or otherwise used with the memory indices to generate full or effective logical memory addresses. In other embodiments, the source packed memory address information 110 may optionally include source packed logical memory addresses (e.g., full or effective logical memory addresses), in which case the optional additional memory address generation information 116 may optionally be omitted. For clarity, the instruction 102 is termed an "indexed load instruction," since indices are often used, although there is no requirement that indices be used. Likewise, in some embodiments, the indexed load instruction may optionally explicitly specify or otherwise indicate an optional destination memory address information 118 (e.g., a destination memory index or destination logical memory address). The optional destination memory address information may be used when the destination storage location 124, where a result packed data 126 is to be stored when the instruction is performed, is optionally a memory location (or a cached memory location), although this is not required. In some cases, the instruction may have one or more source and/or destination operand specification fields to specify registers, memory locations, or other storage locations to provide one or more of these operands. In other cases, one or more of these operands may optionally be stored in a register, memory location, or other storage location that is implicit to the instruction (e.g., implicit to an opcode of the instruction). A combination of such approaches may also optionally be used.

Different types of the optional additional memory address generation information 116 are suitable for different embodiments depending upon the particular memory addressing mode. By way of example, the optional additional memory address generation information may represent information that when combined with each of the source packed memory indices and/or the optional destination memory index 118 may be operative to generate full or effective virtual, linear, or other logical memory addresses. The precise way in which this is done may depend upon the particular architecture, and the memory addressing mechanism that is employed. Examples of suitable memory address generation information includes, but is not limited to, a scale factor, a base, a segment, and various combinations thereof.

As shown in the illustrated embodiment, the source packed memory address information 110 may be stored in a set of packed data registers 108. The optional additional memory address generation information 116, and the optional destination memory address information 118, may optionally be stored in a set of scalar registers 114 (e.g., a set of general-purpose registers, special memory addressing registers, etc.). Alternatively, other storage locations may optionally be used for one or more of these operands. Each of the packed data registers, and the scalar registers, may represent an on-die and/or on integrated circuit storage location that is operative to store data. The packed data registers may be operative to store packed data, vector data, or single instruction, multiple data (SIMD) data. The packed data registers, and the scalar registers, may represent architecturally-visible or architectural registers, which are visible to software and/or a programmer, and/or are the registers indicated by instructions of the instruction set of the processor to identify operands. These architectural registers are contrasted to other non-architectural registers in a given microarchitecture (e.g., temporary registers, reorder buffers, retirement registers, etc.). The packed data registers may be implemented in different ways in different microarchitectures, and are not limited to any particular type of design. Examples of suitable types of registers include, but are not limited to, dedicated physical registers, dynamically allocated physical registers using register renaming, and combinations thereof. Specific examples of the suitable packed data registers include and scalar registers include, but are not limited to, the packed data registers 1310 and the scalar registers 1325 of FIG. 13.

Referring again to FIG. 1, the processor includes a decode unit or decoder 104. The decode unit may be coupled to receive, and may be operative to decode, the indexed load instruction 102. The decode unit may output one or more relatively lower-level instructions or control signals (e.g., one or more microinstructions, micro-operations, microcode entry points, decoded instructions or control signals, etc.), which reflect, represent, and/or are derived from the relatively higher-level indexed load instruction. In some embodiments, the decode unit may include at least one input structure (e.g., a port, interconnect, or interface) to receive the indexed load instruction, an instruction recognition and decode logic coupled therewith to recognize and decode the indexed load instruction, and at least one output structure (e.g., a port, interconnect, or interface) coupled therewith to output the one or more lower-level instructions or control signals. The decode unit may be implemented using various different mechanisms including, but not limited to, microcode read only memories (ROMs), look-up tables, hardware implementations, programmable logic arrays (PLAs), and other mechanisms suitable to implement decode units. In some embodiments, the decode unit may be included on a die (e.g., on die with the execution unit 106). In some embodiments, the decode unit may include at least some hardware (e.g., transistors, integrated circuitry, or on-die firmware, etc.).

In some embodiments, instead of the indexed load instruction 102 being provided directly to the decode unit 104, an instruction emulator, translator, morpher, interpreter, or other instruction conversion module (not shown) may optionally be used. Various types of instruction conversion modules may be implemented in software, hardware, firmware, or a combination thereof. In some embodiments, the instruction conversion module may be located outside the processor, such as, for example, on a separate die and/or in a memory (e.g., as a static, dynamic, or runtime emulation module). By way of example, the instruction conversion module may receive the indexed load instruction, which may be of a first instruction set, and may emulate, translate, morph, interpret, or otherwise convert the indexed load instruction into one or more corresponding intermediate instructions or control signals, which may be of a second different instruction set. The one or more intermediate instructions or control signals of the second instruction set may be provided to a decode unit (e.g., decode unit 104), which may decode them into one or more lower-level instructions or control signals executable by native hardware of the processor (e.g., one or more execution units).

Referring again to FIG. 1, the execution unit 106 is coupled with the decode unit 104, the packed data registers 108, and the scalar registers 114. In some embodiments, the execution unit may be on a die or integrated circuit (e.g., on die or integrated circuit with the decode unit). The execution unit may receive the one or more decoded or otherwise converted instructions or control signals that represent and/or are derived from the indexed load instruction. The execution unit may also be coupled to receive the source packed memory address information 110, the optional additional memory address generation information 116, and the optional destination memory address information 118. The execution unit may be operative in response to and/or as a result of the indexed load instruction (e.g., in response to one or more instructions or control signals decoded from the instruction and/or in response to the instruction being decoded and/or in response to the instruction being provided to a decoder) to execute or otherwise perform the operations of the indexed load instruction.

In some embodiments, the execution unit 106 and/or the processor 100 may be operative in response to and/or as a result of the indexed load instruction 102 to gather, otherwise read, or otherwise load multiple data elements (e.g., A, B, C, and D) from the memory 120. The processor may be operative to be coupled with the memory when deployed together in a computer system, or may be coupled with the memory if both are disposed on the same system-on-chip (SoC). The processor and memory may be coupled by various coupling mechanisms, such as, for example, one or more buses or other interconnects, hubs, memory controllers, chipset components, and various combinations thereof). In this example, the data elements are the memory (e.g., main or primary memory), although the data elements may also or alternatively optionally be gathered from secondary or backing memory, a mass storage device, a local area network, wide area network, Internet connected storage, or the like.

In the illustrated embodiment, four data elements (e.g., A, B, C, and D) are loaded from the memory 120 based on and/or using (optionally with the additional addressing information 116) the source packed memory address information 110 (e.g., four memory indices I0, I1, I2, and I3). For example, the first data element A may be loaded from a physical memory address or location based on and/or using and/or corresponding to the first index I0, the second data element B may be loaded from a physical memory address or location with the second index I1, the third data element C may be loaded from a physical memory address or location with the third index I2, and the fourth data element D may be loaded from a physical memory address or location with the fourth index I3.

As shown, the data elements (e.g., A, B, C, and D) may commonly be loaded from non-contiguous storage locations 122 in the memory. In some cases, the non-contiguous storage locations may be relatively widely dispersed or sparse. There are various different types of applications and/or algorithms that commonly access data that is widely dispersed or sparse. For example, this may be the case when processing sparse matrices or other sparse data structures (e.g., a sparse matrix-vector multiplication). As another example, this may be the case when performing large stride accesses to data in large and/or multi-dimensional tables or other data structures. As yet another example, this may be the case in algebraic multigrid (AMG) algorithms. Various other examples are also found especially in big data and/or high performance computing applications. In such applications and/or algorithms, the ability to quickly access data from non-contiguous, widely dispersed, or sparse memory locations, may tend to significantly affect performance. It is hoped and believed that the approaches disclosed herein may help to improve the performance of many such applications and/or algorithms, although the scope of the invention is not so limited.

In some embodiments, each of the data elements that is loaded may optionally be loaded together with less than a full cache line amount of data (e.g., no more than half a cache line amount of data), although this is not required. For example, in some embodiments, each of the data elements that is loaded may optionally be loaded by itself without any additional data, although this is not required. For example, loading an 8-bit, 16-bit, 32-bit, or 64-bit data element, respectively, may involve only loading 8-bits, 16-bits, 32-bits, or 64-bits of data, instead of loading a full cache line (e.g., a 512-bit cache line) containing the data element. Advantageously, this may help to more effectively utilize the available interconnect bandwidth and/or memory access bandwidth. Additionally, this may also help to reduce power consumption, since fewer bits need to be conveyed on interconnects or other structures and/or stored, while being moved up the memory hierarchy.

Referring again to FIG. 1, in some embodiments, the execution unit 106 and/or the processor 100 may be operative in response to and/or as a result of the indexed load instruction 102 to store the multiple loaded data elements as the result packed data 126 in the destination storage location 124. In some embodiments, the multiple loaded data elements may be stored as a contiguous 128 block of data elements (e.g., A, B, C, and D) in the destination memory location. The result packed data in the destination storage location may have the data elements in sequential, adjoining, or otherwise contiguous data element positions or storage locations. Advantageously, the contiguous data elements may provide a compact and efficient format for further processing. By way of example, this compact format may help to allow all of the data elements to be stored in a single cache line and/or may help to allow all of the data elements to be loaded into a packed data register by a single subsequent vector register load instruction.

Different destination storage locations may optionally be used in different embodiments. In various embodiments, the destination storage location 124 may optionally be a destination memory location in the memory 120, a cache line in a cache that is used to cache a destination memory address or location, or a non-architectural on-die storage location other than a cache (e.g., an on-die dedicated scratchpad memory, stream buffer, or other on-die micro-architectural storage). Such non-architectural on-die storage location may differ from a cache in that they may not use a cache coherency protocol, may not have an automatic or autonomous cache line replacement algorithm, etc. In some embodiments, the destination storage location 124 may not be located within the packed data registers 108. As shown by the "X" in the illustration, the instruction may not a destination packed data register 112 as the destination storage location 124. Commonly there are relatively few packed data registers. For example, depending upon the processor there may be around 8, 16, 32. Commonly the packed data registers represent a relatively precious resource. One possible advantage of not using the packed data register for the destination storage location is that it may not be tied up, potentially for relatively long durations while the data elements are being loaded, and may be free to be used for other purposes. There is generally a significantly larger number of memory locations or cache locations, such that they may not be as precious a resource to consume. Also, having a larger number of destination storage locations may optionally allow a relatively large number of indexed load instructions to be performed concurrently, if desired. Alternatively, in other embodiments, the destination storage location may optionally be a destination packed data register, if desired.

The execution unit 106 and/or the processor 100 may include specific or particular logic (e.g., transistors, integrated circuitry, or other hardware potentially combined with firmware (e.g., instructions stored in non-volatile memory) and/or software) that is operative to perform the indexed load instruction 102 and/or load the indexed data elements (e.g., A, B, C, D) and store the result packed data 126 in response to and/or as a result of the indexed load instruction (e.g., in response to one or more instructions or control signals decoded from the indexed load instruction). By way of example, the execution unit may include a load-store unit, a gather unit, a memory access unit, an execution engine unit, or the like. In some embodiments, the execution unit may include at least one input structure (e.g., a port, interconnect, or interface) to receive source operands, circuitry or other logic coupled therewith to receive and process the source operands and load the data elements from the memory, and at least one output structure (e.g., a port, interconnect, or an interface) coupled therewith to output the result packed data. In some embodiments, the execution unit may optionally be similar to or the same as the execution unit 406 of FIG. 4, although the scope of the invention is not so limited.

To avoid obscuring the description, a relatively simple processor 100 has been shown and described. However, the processor may optionally include other processor components. For example, various different embodiments may include various different combinations and configurations of the components shown and described for any of FIGS. 14B, 15A, 15B, 16. All of the components of the processor may be coupled together to allow them to operate as intended. By way of example, considering FIG. 14B, the instruction cache unit 1434 may cache the instruction, the instruction fetch unit 1438 may fetch the instruction, the decode unit 1440 may decode the instruction, the scheduler unit 1456 may schedule the associated operations, the memory access unit 1464 and/or the execution engine unit 1450 may perform the instruction, the retirement unit 1454 may retire the instruction, etc.

FIG. 2 is a block flow diagram of an embodiment of a method 230 of performing an embodiment of an indexed load instruction with a destination storage location that is not a packed data register. In various embodiments, the method may be performed by a processor, instruction processing apparatus, digital logic device, or integrated circuit. In some embodiments, the method 230 may be performed by and/or with the processor 100 of FIG. 1 and/or using the instruction 102 of FIG. 1. The components, features, and specific optional details described herein for the processor 100 and/or the instruction 102, also optionally apply to the method 230. Alternatively, the method 230 may be performed by and/or within a similar or different processor or apparatus and/or using a similar or different instruction. Moreover, the processor 100 may perform methods the same as, similar to, or different than the method 230.

The method includes receiving the indexed load instruction, at block 231. In various aspects, the instruction may be received at a processor or a portion thereof (e.g., an instruction fetch unit, a decode unit, a bus interface unit, etc.). In various aspects, the instruction may be received from an off-processor and/or off-die source (e.g., from memory, interconnect, etc.), or from an on-processor and/or on-die source (e.g., from an instruction cache, instruction queue, etc.). The instruction may specify or otherwise indicate a packed data register that stores a source packed memory address information. The source packed memory address information may include a plurality of memory address information data elements.

The method also includes loading a plurality of data elements from a plurality of memory addresses that each correspond to a different one of the plurality of memory address information data elements, in response to and/or as a result of the indexed load instruction, at block 232.

The method also includes storing the plurality of loaded data elements in a destination storage location in response to and/or as a result of the indexed load instruction, at block 233. In some embodiments, the destination storage location does not include a packed data register.

The illustrated method 230 involves architectural operations (e.g., those visible from a software perspective). In other embodiments, the method may optionally include one or more micro-architectural operations. By way of example, the instruction may be fetched, decoded, scheduled out-of-order, source operands may be accessed, an execution unit may perform micro-architectural operations to implement the instruction, etc. In some embodiments, the micro-architectural operations to implement the instruction may optionally include performing non-temporal and/or uncached loads, with respect to the source memory addresses, to load the data elements (e.g., in order to help reduce cache pollution), although this is not required. In some embodiments, the micro-architectural operations to implement the instruction may optionally include writing or storing the contiguous data elements of the result packed data to a given cache level (e.g., a specified or implicit cache level, which may optionally be a second level or level 2 (L2) cache), although this is not required. In some embodiments, the micro-architectural operations to implement the instruction may optionally include any of those shown and described further below for FIGS. 3-7 and 9, although the scope of the invention is not so limited.

Figure 3:
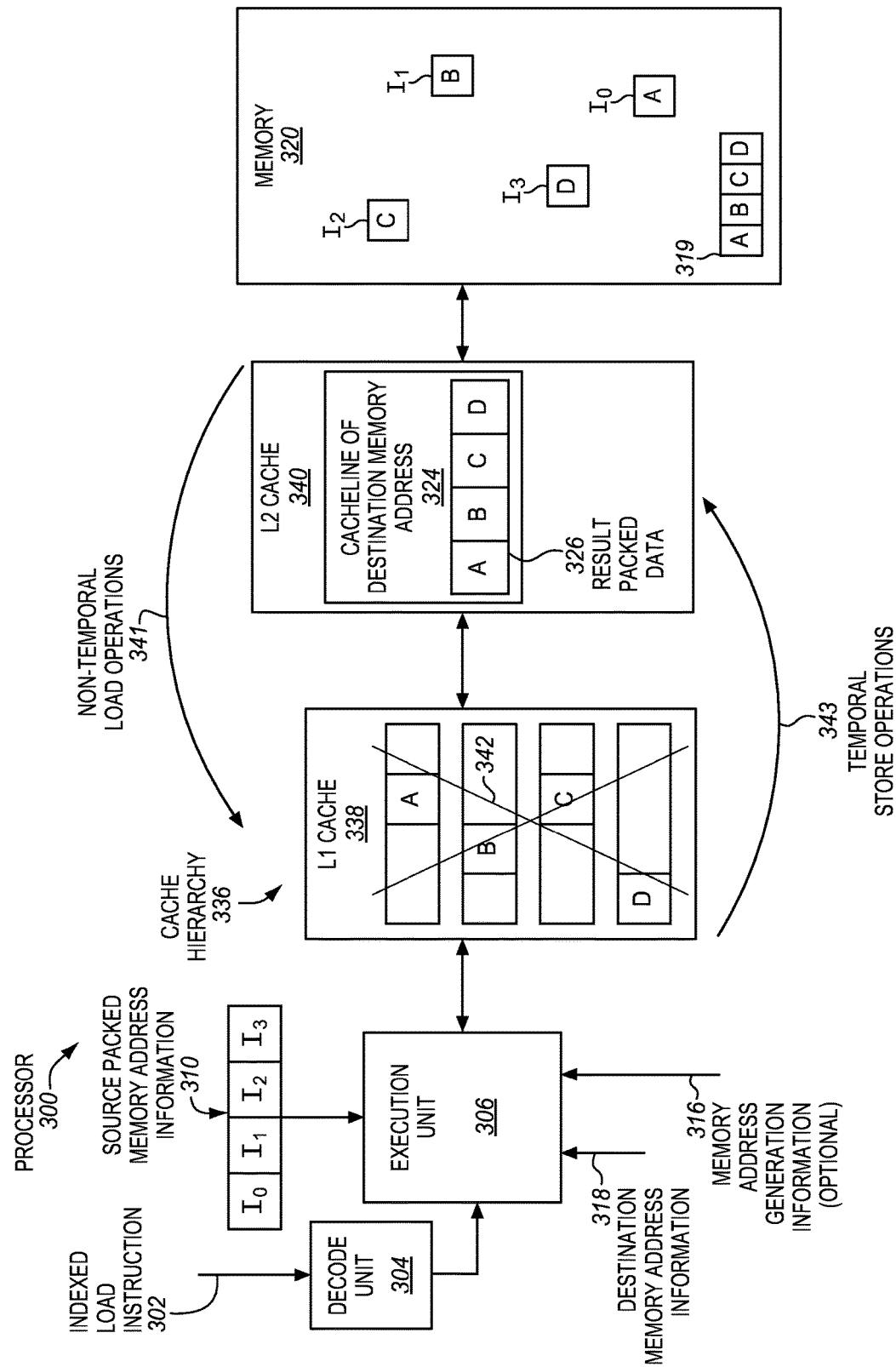
FIG. 3 is a block diagram of an embodiment of a processor that is operative to perform an embodiment of an indexed load instruction with non-temporal load operations that bypass caches.

FIG. 3 is a block diagram of an embodiment of a processor 300 that is operative to perform an embodiment of an indexed load instruction 302 with non-temporal load operations 341 that bypass one or more caches 338, 340. The processor 300 may be the same as, similar to, or different than, the processor 100 of FIG. 1. The processor 300 includes a decode unit 304 and an execution unit 306 that utilize a source packed memory address information 310, a destination memory address information 318, and optional additional memory address generation information 316. These components may optionally be similar to, or the same as, (e.g., have any one or more characteristics that are the same as or similar to) the correspondingly named components of FIG. 1, including all the variations and alternatives mentioned therefor. To avoid obscuring the description, the different and/or additional characteristics of the embodiment of FIG. 3 will primarily be described below.

During operation, the decode unit 304 may receive and decode the indexed load instruction 302. In some embodiments, the indexed load instruction may explicitly specify (e.g., through one or more fields or sets of bits), or otherwise indicate (e.g., implicitly indicate), a source packed memory address information 310 (e.g., packed memory indices I0, I1, I2, and I3). In some embodiments, the indexed load instruction may optionally explicitly specify or otherwise indicate a destination memory address information 318 (e.g., a destination memory index or a destination logical address) where a result packed data 326 is to be stored. In some embodiments, the indexed load instruction may optionally explicitly specify or otherwise indicate optional additional memory address generation information 316 to be used with the source packed memory indices and/or the destination memory memory index to generate memory addresses.

The execution unit 306 is coupled with the decode unit 304. The execution unit may receive one or more decoded or otherwise converted instructions or control signals that are decoded from and/or represent and/or are derived from the indexed load instruction 302. The execution unit may also be coupled to receive the source packed memory address information 310, the destination memory address information 318, and the optional additional memory address generation information 316. The execution unit may be operative in response to and/or as a result of the indexed load instruction 302 (e.g., in response to one or more instructions or control signals decoded from the instruction and/or in response to the instruction being decoded and/or in response to the instruction being provided to a decoder) to perform the indexed load instruction.

In some embodiments, the execution unit 306 and/or the processor 300 may be operative in response to and/or as a result of the indexed load instruction 302 to load multiple data elements (e.g., A, B, C, and D) from the memory 320 based on and/or using corresponding memory address information (e.g., the memory indices I0, I1, I2, and I3, and the optional additional memory address generation information 316). The data elements may often be loaded from potentially non-contiguous memory locations as previously described. In some embodiments, less than full cache line amounts of data may optionally be loaded for each of the data elements and/or each of the data elements may optionally be loaded by itself without any additional neighboring data elements. Advantageously, this may help to better utilize interconnect and/or memory access bandwidth and/or reduce power consumption, as previously described.

In some embodiments, the data elements (e.g., A, B, C, D) may optionally be loaded by non-temporal or uncached load operations 341. The processor may have at least one cache 338, or optionally a cache hierarchy 336 that includes two or more caches at two or more cache levels. In the particular illustrated embodiment, the cache hierarchy includes a first level or level 1 (L1) cache 338, and a second level or level 2 (L2) cache 340. Other embodiments may optionally have either fewer or more cache levels. The cache levels may differ in their relative closeness to the execution unit 306 and/or a core in which the execution unit is included. The L1 cache may be closest to the execution unit or core, whereas the L2 cache may be the next closest to the execution unit or core. In another embodiment, there may optionally be an additional third level or level 3 (L3) cache (not shown), that is still further from the execution unit or core. Each of the caches may either be dedicated to the corresponding core, or shared by two or more cores. Commonly, one or more of the lowest cache levels (e.g., the L1 cache and in some cases the L2 cache) may be dedicated to the core, whereas one or more of the highest cache levels (e.g., the L3 cache and in some cases the L2 cache) may be shared by (e.g., used to cache data for) two or more cores, although this is not required.

The L1 cache 338 and the L2 cache 340 may represent relatively small, fast access, local storage, which is relatively closer to the execution unit 306, and/or the core in which the execution unit is included, than the memory 320. During operation the caches may be used to cache or otherwise store a portion of data from the memory that has already been loaded into the processor. Subsequently, when the processor wants to load data from the memory, or write to data in the memory, the caches may first be checked to see if a copy of the data has already been stored in the caches. If the data has already been stored in the caches, then the data may be accessed quickly from the caches, which may help to avoid a slower access to the data from the memory. Generally, accesses to data in the caches at the lower cache levels are faster than accesses to data in the caches at the higher cache levels. Commonly the caches at the lower cache levels are smaller than the caches at the higher cache levels. Accordingly, the caches, and especially the caches at the lowest cache levels, may provide value storage space, which if utilized effectively may help to improve performance.

In order for the caches 338, 340 to be most effective, it is generally important to keep them filled with relevant data, which is likely to be needed again in the near future. Cache line replacement algorithms and policies are typically used to replace cache lines over time with new cache lines having new data. The cache line replacement algorithms and policies often determine candidate cache lines for eviction based at least in part on the age of the data and/or how recently it has been used. One reason for this is that accesses to data in memory often exhibits what is known as "temporal locality," in which data that has been used is commonly reused within a relatively short period of time. In addition, full or entire cache lines of data are conventionally generally loaded from the memory, and stored in the caches, instead of just the specific individual data elements or portions of the cache lines that are immediately needed. One reason for this is that accesses to data in memory often exhibits what is known as "spatial locality," in which the data nearby or neighboring a given piece of data that is needed will also often be needed within a relatively short period of time.

The caches 338, 340 may also implement a cache coherency mechanism or protocol to help ensure that data in the caches is coherently managed and written back to the system memory at appropriate times. This may help to ensure that all cores, processors, or other entities in the system coherently view correct versions of the data. Examples of suitable cache coherency protocols include, but are not limited to, MESI, MOSI, MOESI, and the like. The MESI protocol includes four states, namely modified (M), exclusive (E), shared (S), and invalid (I), which are indicated by two MESI bits. The MOSI protocol utilizes the owned (O) state in place of the exclusive (E) state. The MOESI protocol utilizes both the exclusive (E) and owned (O) states. The modified state designates a dirty cache line.

Referring again to FIG. 3, in some embodiments, the data elements (e.g., A, B, C, and D) may optionally be loaded from the memory into the processor by the non-temporal or uncached load operations 341. The non-temporal or uncached load operations may be such that cache lines are not allocated for the loaded data elements in any of the caches 338, 340 of the cache hierarchy 336, and the loaded data elements may not be stored in any of the caches, for the source memory addresses (e.g., derived from the source packed memory address information 310). That is, in some embodiments, these loads may bypass the caches, as far as the source memory addresses are concerned.

If the load operations were not performed as non-temporal or uncached, in some cases each of the loaded data elements (e.g., A, B, C, and D) may potentially reside in a different cache line in the memory, especially when the data elements are widely dispersed or sparse. In such cases, loading each of these data elements may cause a different cache line to be evicted from the cache hierarchy to make room for the cache line having the loaded data element. Moreover, commonly the L1 cache, which is typically the smallest and fastest access cache, may be used for the loaded data elements. As shown, four different cache lines could potentially be stored in the L1 cache for the four data elements A, B, C, and D, if the non-temporal load operations 341 were not used. Other indexed load or gather instructions may load even more data elements, such as, for example, eight, sixteen, or even more data elements, which could lead to even more cache lines being evicted in order to make room for the loaded data elements. Especially when the loaded data elements have relatively low spatial and/or temporal locality (e.g., when the data elements are widely dispersed or sparse) this may tend to decrease the effectiveness of the caches. In such cases, cache lines of data with relatively more spatial and/or temporal locality (e.g., which are relatively more likely to be reused in the near future) may be evicted to make room for cache lines of data with relatively less spatial and/or temporal locality (e.g., which are relatively less likely to be reused in the near future). This may effectively represent pollution of the cache with less relevant data. However, as shown by the "X" in the illustration, the non-temporal or uncached load operations 341 may not cause cache lines to be allocated for the loaded data elements, as far as the source memory addresses are concerned.

The non-temporal or uncached load operations 341 may also help to reduce the number of resources (e.g., micro-architectural resources) that are needed in order to implement the indexed load instruction 302. One challenge with implementing conventional gather instructions (e.g., which do not use the non-temporal load operations 341) is that they typically need to use a significant number of micro-architectural resources. Moreover, with such conventional gather instructions, these resources may tend to be tied up for relatively long durations, while the data elements are gathered from memory. One contributing reason for the relatively large number of resources needed to implement conventional gather instructions is that micro-architectural resources generally need to be used to keep track of the cache coherency bookkeeping information for each of the loads from each of the source memory addresses. By way of example, different load buffer entries, different entries in outstanding memory request queues, and the like, may be needed for each of these loads from each of the source memory addresses. Especially when each such conventional gather instruction gathers multiple data elements (e.g., four, eight, sixteen, or more) this may tend to tie up a significant number of micro-architectural resources, which in turn may tend to limit the number of gather instructions that can be outstanding from a core at a particular time.

However, in some embodiments, by performing the non-temporal or uncached load operations 341, the processor may not need to use as many resources (e.g., micro-architectural resources used for cache-coherency bookkeeping information). For example, in some embodiments, since the loads are performed non-temporally or uncached, some resources may not need to be used to keep track of each of the loads from each of the source memory addresses, but rather only where the loaded data is to be stored to (e.g., a single destination storage location instead of four, eight, or sixteen multiple source storage locations). Advantageously, this may help to reduce the pressure on the micro-architectural resources and/or may help to allow more (or optionally even many more) indexed load instructions to be outstanding concurrently at the same time, without needing to significantly increase the number of micro-architectural resources of the processor. In one possible use, this may allow power savings since a single core, or a small subset of the cores, may be used to load all the data needed to fully saturate the memory access bandwidth, which may allow one or more other cores to optionally be powered down (e.g., instead of those cores also needing to run in order to saturate the memory access bandwidth).

In some embodiments, the instruction may explicitly specify (e.g., have one or more bits or a field to explicitly specify) that the data elements are to be loaded non-temporally or uncached (e.g., by the non-temporal or uncached load operations 341) as far as the source memory addresses are concerned. For example, one or more bits or a field of the instruction may be configured to a first value (e.g., a single bit may be set to binary one) to indicate that the data elements are to be loaded non-temporally, or configured to a second different value (e.g., the single bit may be cleared to binary zero) to indicate that the data elements are to be loaded temporally. In other embodiments, it may optionally be implicit to the instruction (e.g., implicit to its opcode) that the data elements are to be loaded non-temporally or uncached (e.g., by the non-temporal or uncached load operations 341) as far as the source memory addresses are concerned. In still other embodiments, two different opcodes may optionally be supported, and for one of the opcodes it may be implicit that the data elements are to be loaded non-temporally, whereas for the other opcode it may be implicit that the data elements are to be loaded temporally. Having the capability of either performing the loads temporally or non-temporally may allow a programmer, compiler, dynamic binary translator, or the like, to better manage the caches (e.g., based on the estimated or perceived spatial and/or temporal locality of the data).

In some embodiments, each of the data elements that is loaded may optionally be loaded with less than a full cache line amount of data (e.g., no more than half a cache line amount of data), although this is not required. For example, in some embodiments, each of the data elements that is loaded may optionally be loaded by itself without any additional data, although this is not required. Advantageously, this may help to more effectively utilize the available interconnect bandwidth and/or memory access bandwidth and/or may help to reduce power consumption.

Referring again to FIG. 3, in some embodiments, the execution unit 306 and/or the processor 300 may be operative, in response to and/or as a result of the indexed load instruction 302, to store the multiple loaded data elements as a result packed data 326 in a cache line 324 copy of a destination memory address or location 319 in the memory 320. In some embodiments, this may be achieved through temporal store operations 343. In some embodiments, the loaded data elements may be stored in contiguous, sequential, or adjoining data element positions which may allow all of the data elements to be stored in a single cache line. In the illustrated example embodiment, the cache line 324 is in the L2 cache 340, although this is not required. One possible reason for using the L2 cache (or alternatively an L3 cache) instead of the L1 cache is that the L2 cache (and the L3 cache) are generally relatively larger and generally slower access, such that it may have a relatively lower impact on performance to tie up a cache line in the L2 cache (or L3 cache) for the duration of the indexed load instruction as compared to the L1 cache. Another possible reason is that the L2 and L3 caches are relatively farther removed from the timing constraints of the core. Alternatively, the L1 cache may optionally be used if desired. In some embodiments, the cache line 324 may optionally be configured to be unreadable and unevictable, while the loads are being performed and until they are completed.

In some embodiments, it may optionally be implicit to the instruction (e.g., implicit to its opcode) to use a given cache or cache level (e.g., which in some embodiments may not be the L1 cache) to cache the result packed data. In some embodiments, different indexed load instructions (e.g., different opcodes) may optionally have different implicit cache levels (e.g., a first opcode may implicitly indicate the L1 cache, a second different opcode may implicitly indicate the L2 cache, a third still different opcode may implicitly indicate the L3 cache, and a fourth still different opcode may implicitly indicate the memory (e.g., for use in non-temporal or uncached stores)).

In other embodiments, the indexed load instruction 102 may optionally have a set of one or more bits or a field (e.g., a cache level indication field) to indicate a given cache or cache level where the result packed data is to be cached. As used herein, the term "field" refers to one or more bits that need not necessarily be contiguous (e.g., physically separated bits may logically represent the field). Values may be arbitrarily mapped or assigned to the different caches or cache levels according to various possible conventions. As one example, a 2-bit field value of '00' may indicate the L1 cache, a value of '01' may indicate the L2 cache, a value of '10' may indicate the L3 cache, and a value of '11' may indicate the memory (e.g., for use in non-temporal or uncached stores). As another example, a 1-bit field value of '0' may indicate the L2 cache and a value of '1' may indicate the memory (e.g., for use in non-temporal or uncached stores). This may allow a compiler or programmer to adjust the cache level (e.g., based on the perceived spatial and/or temporal locality of the data).

Figure 4:
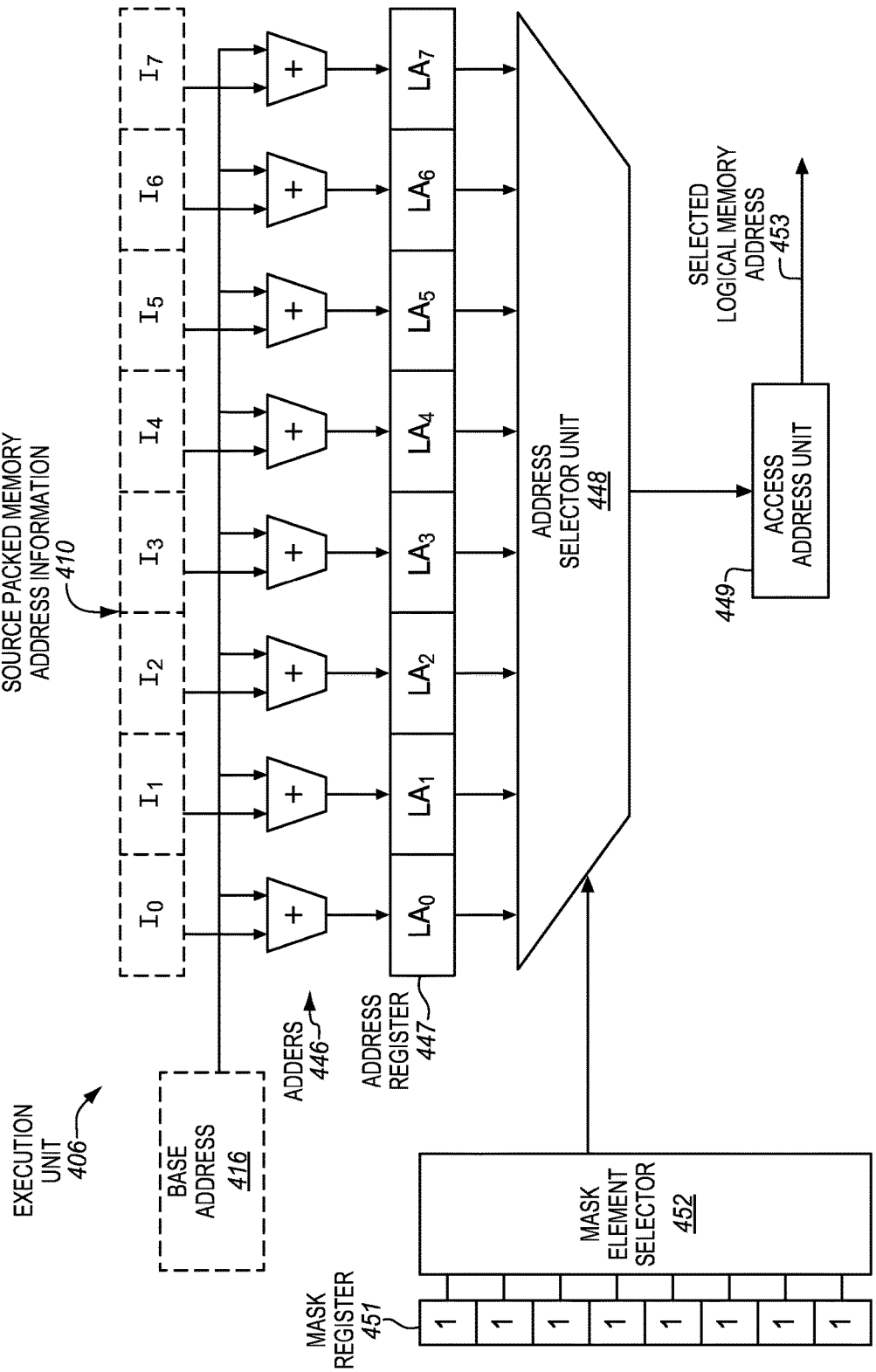
FIG. 4 is a block diagram of an example embodiment of a suitable execution unit to execute an indexed load instruction.

FIG. 4 is a block diagram of an example embodiment of a suitable execution unit 406 to execute an indexed load instruction. The execution unit has inputs coupled to receive a source packed memory address information 410 and a base address 416. In this example, the source packed memory address information has eight packed memory indices I0 through I7. The execution unit includes a set of eight adders each coupled to receive a different one of the memory indices and the base address. Each of the eight adders is operative to apply its corresponding memory index to the base address to generate a corresponding virtual or other logical memory address (LA). The eight indices I0 through I7 are converted into eight corresponding logical memory addresses LA0 through LA7. The execution unit includes a temporary address register 447 to store the logical memory addresses.

The execution unit also optionally includes a mask register 451 to store a mask. The mask includes one mask element, in this case a single bit, for each of the memory indices. For this example, there are eight mask bits. Initially, all of the mask bits are set to binary one, according to one possible convention. A mask element selector 452 is coupled with the mask register. The mask element selector may select mask elements sequentially. For example, the mask element selector may start at one end of the mask register that corresponds to the least significant memory index, and work sequentially toward the other end of the mask register. An address selector unit 448 is coupled with the mask element selector. The address selector unit may be operative to select one or more (e.g., one, two, three, four, five, six, seven, or eight) logical memory address from the address temporary register that corresponds to the selected mask element from the mask register. The address selector may output the selected logical memory address (from one to eight) to an access address unit 449. The access address unit may output or provide one or more (e.g., one, two, three, four, five, six, seven, or eight) logical memory addresses at its output (e.g., to one or more TLBs). The execution unit 406 is designed to output individual logical memory addresses sequentially. In other embodiments, the execution unit may be operative to output two or more logical memory addresses concurrently, or optionally a whole source packed memory address information worth of logical memory addresses concurrently.

Figure 5:
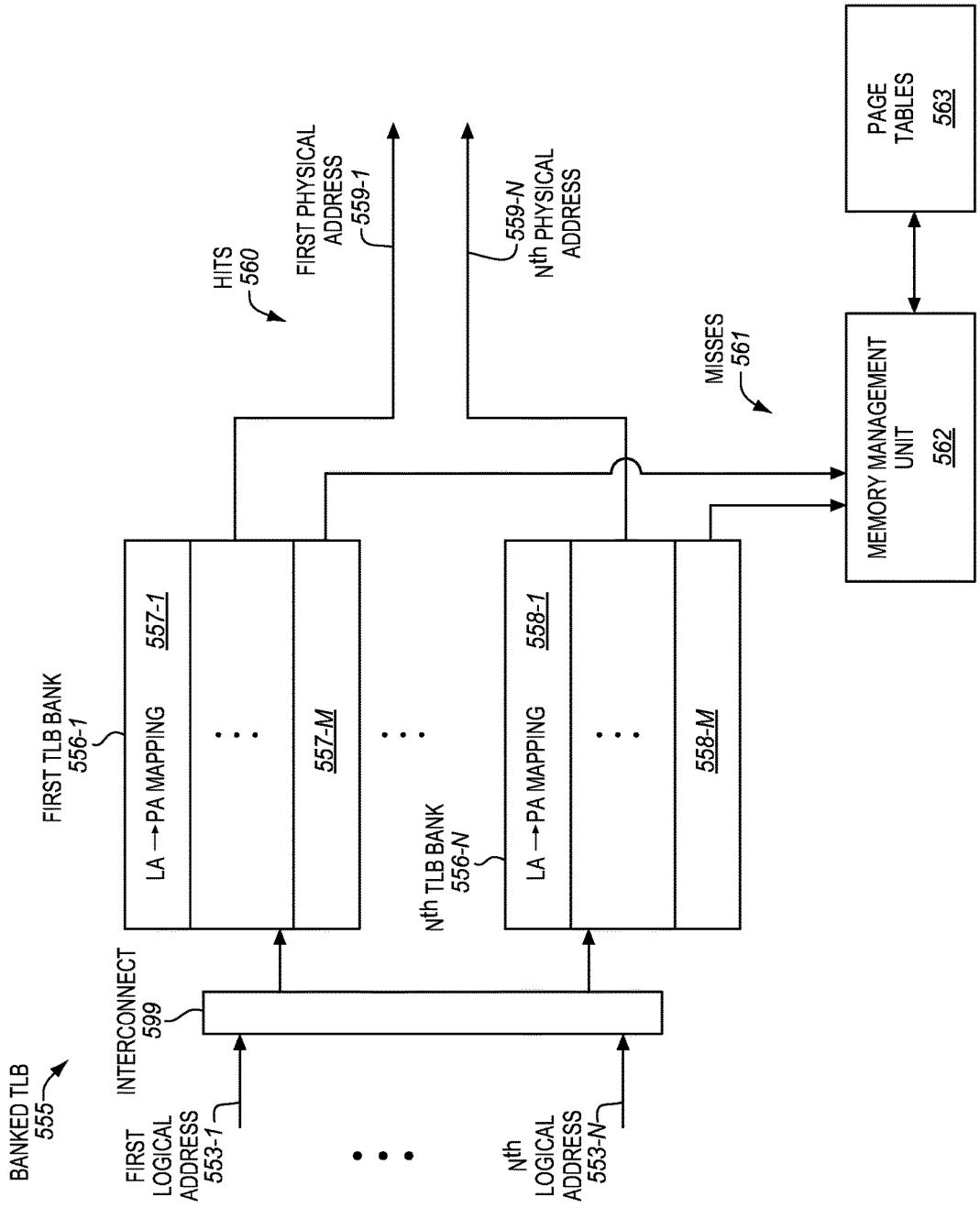
FIG. 5 is a block diagram of an example embodiment of a suitable banked translation lookaside buffer (TLB).

FIG. 5 is a block diagram of an example embodiment of a suitable banked translation lookaside buffer (TLB) 555. At least two virtual, linear, or other logical memory addresses 553 may be input to the banked TLB 555. In the illustrated example, the first logical memory address 553-1 through an Nth logical memory address 553-N are input. In various embodiments, two, four, eight, or sixteen logical memory addresses may optionally be input concurrently. In some embodiments, all of the logical memory addresses of an indexed load instruction (e.g., four, eight, sixteen, or thirty-two) may optionally be input concurrently, although this is not required.

The banked TLB includes a first TLB bank 556-1 through an Nth TLB bank 556-N, where the number of banks (N) is at least two. In various embodiments, there may optionally be two, three, four, five, six, seven, eight, more than eight, or sixteen TLB banks, although the scope of the invention is not so limited. In some embodiments, there may optionally be a same number of TLB banks as a number of logical memory addresses of an indexed load instruction, although this is not required. There is no requirement to use the same number of TLB banks as the number of logical memory addresses input.

The logical memory addresses may need to be converted to corresponding physical memory addresses in order to identify the appropriate physical pages in the memory. Each of the TLB banks may be operative, during use, to cache already performed logical memory address to physical memory address translations. For example, after a page table walk has been performed to translate a logical address to a physical address, the address translation may be cached in the banked TLB. If the address translation is needed again, within a short enough period of time, then the address translation may be retrieved quickly from the banked TLB, instead of needing to perform the slower page table walk again. Typically, each TLB bank may have different entries to store different address translations. As shown, the first TLB bank may have a first entry 557-1 (e.g., storing a first logical address to physical address mapping) through an Mth entry 557-M. Likewise, the Nth TLB bank may have a first entry 558-1 (e.g., storing a logical address to physical address mapping) through an Mth entry 558-M.

In some embodiments, each of the TLB banks may correspond to a different (e.g., mutually exclusive) set of translations. For example, in some embodiments, the addresses of the different TLB banks may be address interleaved with one another. The appropriate TLB bank mapped or assigned to the corresponding logical address, and which may cache the sought translation, may be determined. As shown, in some embodiments, the logical addresses may be provided to a cross-bar or other interconnect 599 that may be used to route the logical addresses to the appropriate TLB bank.

The sought address translation either will or will not be stored in the corresponding TLB bank. A "hit" may occur when the appropriate address translation is stored in the corresponding TLB bank. Conversely, a "miss" may occur when the appropriate address translation is not stored in the corresponding TLB bank. In the event of a hit 560 the address translation may be retrieved from the TLB entry, and the corresponding physical memory address may be output and further used to access the page in the memory. The misses 561 may be directed to a memory management unit (MMU) 562 or a page miss handler thereof. The MMU may be operative to perform a page table walk to determine the translation. For example, the MMU may access a set of page tables 563 generally representing hierarchical paging structures. The MMU may be operative to "walk" or advance through the page tables to locate the address translation. The determined address translation may be used and stored in the banked TLB.

In some cases multiple of the logical addresses may map to the same TLB bank, and none of the logical addresses may map to a given TLB bank, on a given cycle. In the former case the logical addresses may be processed serially. In the latter case the given TLB bank may be idle on that cycle. However, as long as at least two logical addresses are mapped to and serviced by at least two different corresponding TLB banks, at least some concurrency or parallelism in performing the address translation may occur. Advantageously, this may help to increase the throughput or performance of performing indexed load instructions. However, the use of the banked TLB 555 is optional not required.

Figure 6:
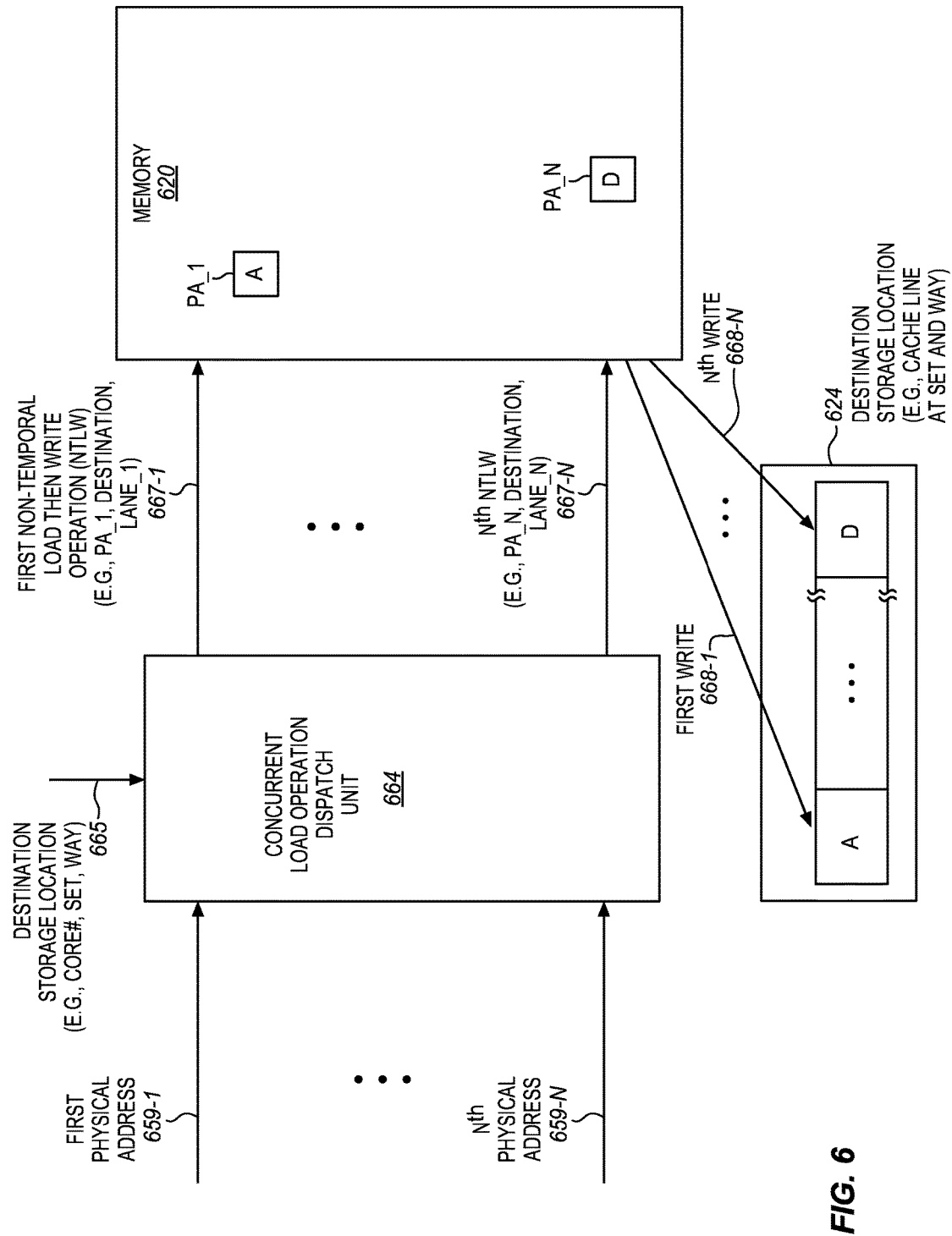
FIG. 6 is a block diagram of an example embodiment of a suitable concurrent load operation dispatch unit.

FIG. 6 is a block diagram of an example embodiment of a suitable concurrent load operation dispatch unit 664. The concurrent load operation dispatch unit may be coupled to receive a first physical memory address 659-1 through an Nth physical memory address 659-N, where the number of physical memory address (N) is at least two. In various embodiments, the number of physical memory addresses may optionally be two, three, four, at least four, five, six, seven, eight, at least eight, sixteen, or thirty-two, although the scope of the invention is not so limited. In some embodiments, there may optionally be a same number of physical memory addresses as a number of source memory addresses for an indexed load instruction (e.g., four, eight, sixteen, or thirty-two), although this is not required.

The concurrent load operation dispatch unit 664 may also be coupled to receive information 665 that indicates a destination storage location of an indexed load instruction. In some embodiments, in the case of the destination storage location being in a cache line in a cache, the information may include a number of a core (core#) having the cache, and a set and way for the cache line. Other destination storage locations may optionally be indicated differently. For example, different storage locations in an on-die dedicated scratchpad memory may be indicated by different storage location indices, addresses, or other numbers.

In some embodiments, the concurrent load operation dispatch unit 664 may be operative to initiate or dispatch multiple load operations 667 concurrently and/or in parallel. In some embodiments, the concurrent load operation dispatch unit may be operative to initiate or dispatch a different load operation for each of the received physical memory addresses and/or for each of the different source memory addresses of an indexed load instruction concurrently and/or in parallel. In some embodiments, these load operations may optionally be non-temporal load, then write operations (NTLW), although the scope of the invention is not so limited. The NTLW may bypass the cache(s) as far as the source memory addresses are concerned, as previously described in conjunction with FIG. 3 (e.g., to help reduce cache pollution and/or help to reduce the number of cache-coherency bookkeeping or other micro-architectural resources to track the loads from the source memory addresses).

As shown in the illustrated embodiment, a first NTLW 667-1 having the first physical memory address 659-1 (PA_1) as its source memory address, indicating the destination storage location (e.g., core#, set, and way), and indicating its corresponding lane (lane_1) (e.g., of the result packed data and/or destination storage location where the data element it causes to be loaded is to be stored) may be dispatched. Similarly, concurrently and/or in parallel, an Nth NTLW 667-N having the Nth physical memory address 659-N (PA_N) as its source memory address, indicating the same destination storage location (e.g., core#, set, and way), and indicating its corresponding lane (lane_N) (e.g., of the result packed data and/or destination storage location where the data element it causes to be loaded is to be stored) may be dispatched. By way of example, the load operation corresponding to a least significant memory index of the source packed memory address information may indicate the least significant lane, the load operation corresponding to a next-to-least significant memory index may indicate the next-to-least significant lane, and so on. As shown, the load operation corresponding to PA_1 and lane_1 may load the data element A and perform a first write 668-1 to store it to the lane_1 of the destination storage location. Likewise, the load operation corresponding to PA_N and lane_N may load the data element D and perform an Nth write 668-N to store it to the lane_N of the destination storage location.

Advantageously, the concurrent load operation dispatch unit 664 may help to improve the speed or concurrency of dispatching component load operations of indexed load instructions, which may help to increase the throughput or performance of performing indexed load instructions. Furthermore, in some embodiments, there may optionally be multiple such concurrent load operation dispatch units. For example, in some multi-core and/or multi-tile embodiments, there may optionally be a concurrent load operation dispatch unit for each core and/or each tile. By way of example, the concurrent load operation dispatch unit may optionally be located and/or coupled near a corresponding tag directory for the core and/or tile. The concurrent load operation dispatch unit used for an indexed load instruction may be determined based on the destination physical address of the indexed load instruction. Only one core and/or tile and its associated concurrent load operation dispatch unit may "home" that physical address. In some embodiments, the different concurrent load operation dispatch units for the different cores and/or tiles may each currently dispatch load operations for different corresponding indexed load instructions, which may further help to increase the amount of concurrency and/or parallelism.

Figure 7A:
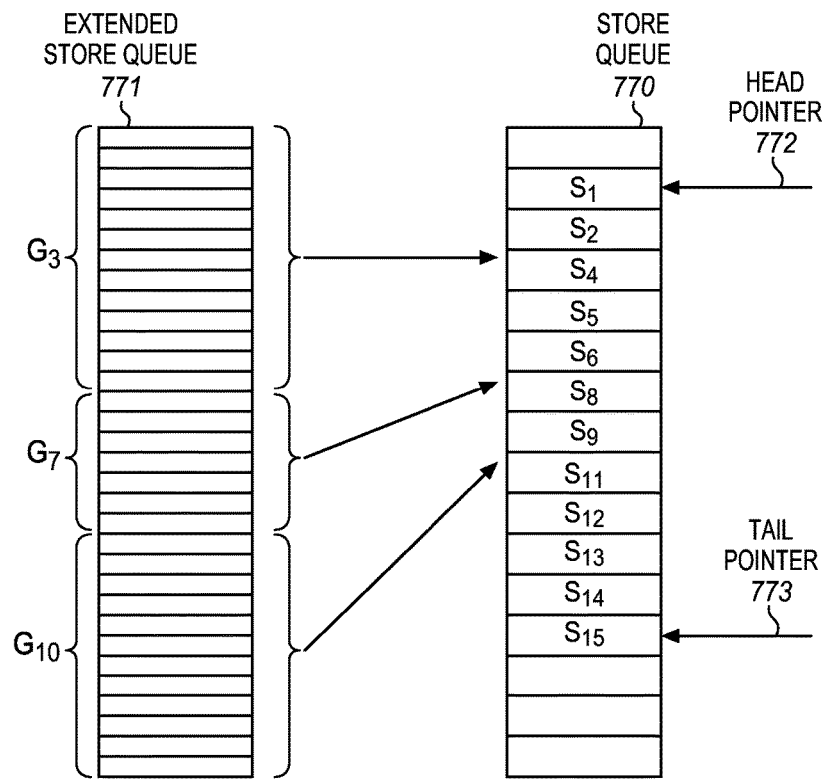
FIG. 7A is a block diagram of an example store queue, and an example embodiment of a suitable extended store queue.

FIG. 7A is a block diagram of an example store queue 770 and an example embodiment of a suitable extended store queue 771. The illustrated store queue has sixteen entries. A number of store operations (e.g., S1, S2, S4, S5, S6, S8, S9, S11, S12, S13, S14, S15) are queued in the entries. In the illustrated embodiment, a head pointer 772 is pointing to an entry toward the top of the store queue to indicate the next store operation from the store queue to retire. A tail pointer 773 is pointing to an entry toward the bottom of the store queue to indicate the last store operation queued.

Generally, the number of entries in the store queue may tend to be limited. One contributing reason that there are not more store queue entries is that they are often implemented with relatively large area and/or large power consumption structures. For example, this may tend to be especially the case when the entries of the store queue are implemented with content-addressable memory (CAM), are otherwise operative to support store to load forwarding of store operations in the entries of the store queue to subsequent load operations, or the like. In such cases, it may not be desired to include additional entries in the store queue in order to avoid increasing the area and/or power consumption of the store queue. As a result, for many applications, especially memory access intensive applications, there may not be as many entries in the store queue as desired.

In some embodiments, the extended store queue 771 may be used to queue indexed load operations corresponding to indexed load instructions as disclosed herein. In some embodiments, the extended store queue may offload the indexed load operations from the store queue so that they don't need to consume any entries in the store queue. As shown in the illustrated example, thirty-two indexed load operations (each corresponding to a destination storage location of a different corresponding indexed load instruction) are queued in the extended store queue, although this is only one illustrative example. These thirty-two indexed load operations are grouped into three different groups, with thirteen being in the topmost group (G3), seven being in the middle group (G7), and twelve being in the bottommost group (G10), although this is only one illustrative example.

In some embodiments, the indexed load operations may be retired or otherwise committed from the extended store queue in order with respect to one another, and in order with respect to the store operations in the store queue. Before committing an operation, both the store queue and the extended store queue may be searched or checked to determine which one currently queues the more senior operation, and then the more senior operation, in either the store queue or the extended store queue, may be committed. Since the indexed load instruction may collect the multiple loaded data elements into one contiguous destination storage location (e.g., one cache line), the extended store queue may take advantage that the multiple store operations are to the same contiguous destination storage location, and represent the entire set as one position in the extended store queue that is ordered relative to the stores being processed from the store queue.

Figure 7B:
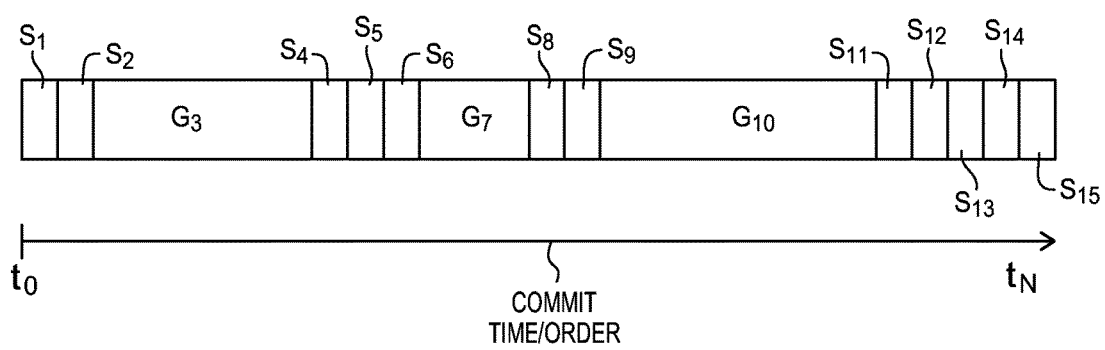
FIG. 7B shows an order in which the operations of the example of FIG. 7A may be committed.

FIG. 7B shows an order in which the operations of the example of FIG. 7A may be committed. First, the store operations S1 and S2 may be committed one at a time in order from the store queue, then the store operation S2 may be committed from the store queue, and then the topmost group (G3) of indexed load operations may be committed one at a time in order from the extended store queue before control is returned to the store queue. Next, the store operations S4, S5, and S6 may be committed one at a time in order from the store queue, then the middle group (G7) of indexed load operations may be committed one at a time in order from the extended store queue before control is returned to the store queue. Next, the store operations S8 and S9 may be committed one at a time in order from the store queue, then the bottommost group (G10) of indexed load operations may be committed one at a time in order from the extended store queue before control is returned to the store queue, and then finally the store operations S11, S12, S13, S14, and S15 may be committed one at a time in order from the store queue.

Because only one entry in the extended store queue may be needed for each indexed load instruction more indexed load instructions may be outstanding concurrently for a given number of entries in the extended store queue. In addition, because the entries of the extended store queue may optionally be relatively less costly in area and/or power consumption to implement (e.g., may not support store to load forwarding), the extended store queue may potentially have more or even many more entries than would generally be practicable for the store queue. The extended store queue may help to relieve pressure on the store queue and/or allow more indexed load instructions to be outstanding at the same time. However, the use of the extended store queue is optional not required.

Figure 8:
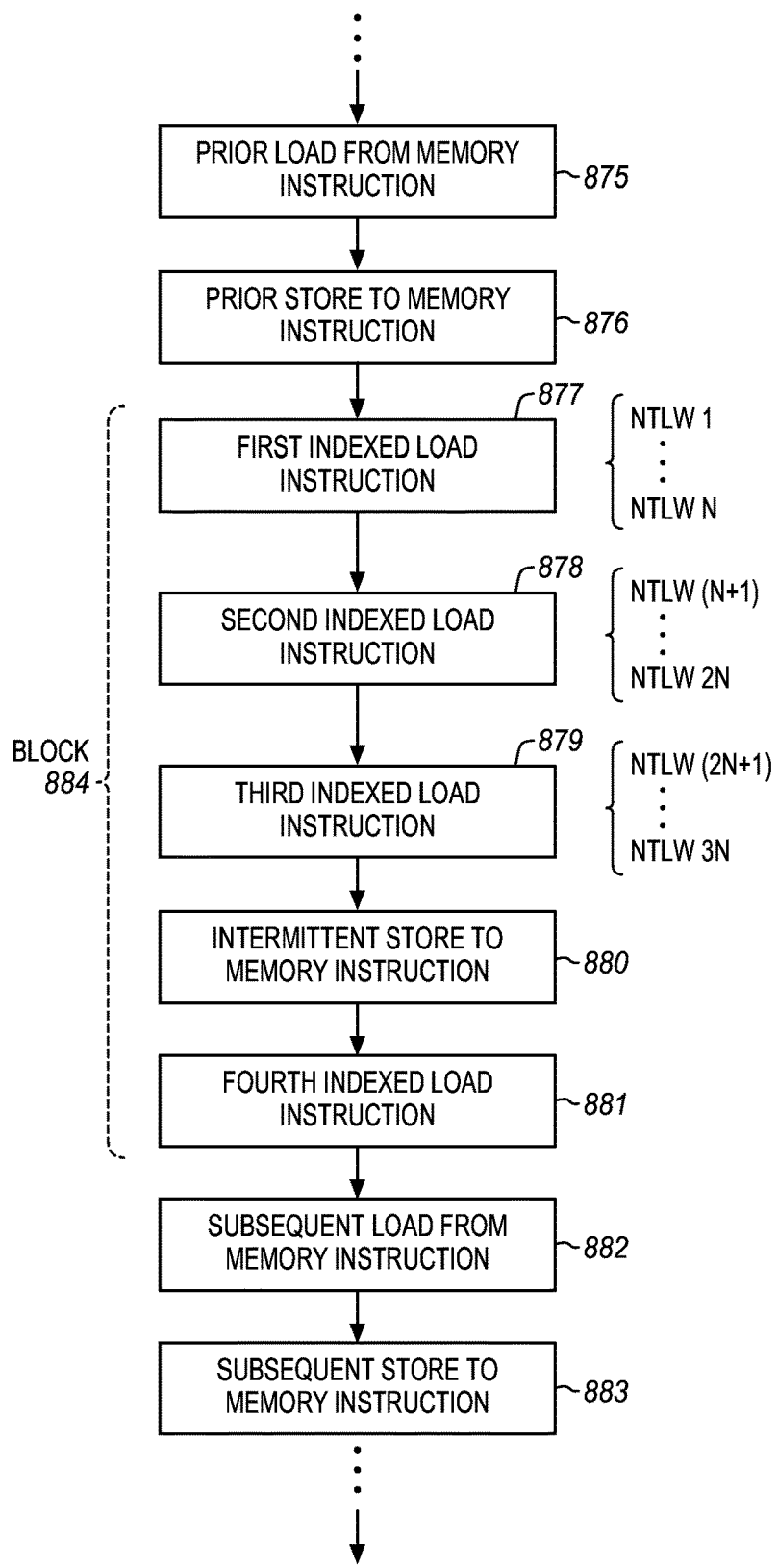
FIG. 8 is a block flow diagram of an example sequence of instructions that illustrates an example embodiment suitable memory ordering semantics.

FIG. 8 is a block flow diagram of an example sequence of instructions 874 to illustrate an example embodiment suitable memory ordering semantics. The sequence of instructions is shown in original program order (e.g., before any out of order execution or reordering), with the earliest/oldest instructions at the top and the latest/youngest instructions at the bottom. The sequence includes a prior load from memory instruction 875, and a prior store to memory instruction 876, which are prior to a block 884 of a first indexed load instruction 877, a second indexed load instruction 878, a third indexed load instruction 879, and a fourth indexed load instruction 881. The sequence also includes a subsequent load from memory instruction 882, and a subsequent store to memory instruction 883, which are after the block 884. An intermittent store to memory instruction 880 is disposed within the indexed load instructions of the block 884.

In some embodiments, a first memory ordering rule or semantic, which may optionally be used for the indexed load instructions, is that load instructions that are prior to a contiguous set of one or more indexed load instructions retire or otherwise commit before any of the indexed load instructions of the contiguous set issue. By way of example, the prior load from memory instruction 875 which is prior to the contiguous first, second, and third indexed load instructions 877, 878, 879, may commit before any of the indexed load instructions 877, 878, 879 issue.

In some embodiments, a second memory ordering rule or semantic, which may optionally be used for the indexed load instructions, is that an indexed load instruction is implemented as component load operations (e.g., non-temporal load operations) that will be ordered at a tag directory before a subsequent load instruction is committed. By way of example, the first indexed load instruction 877 may be implemented as component NTLW 1 through NTLW N that will be ordered at a tag directory before the subsequent load from memory instruction 882 is committed.

In some embodiments, a third memory ordering rule or semantic, which may optionally be used for the indexed load instructions, is that indexed load instructions are stored in order with respect to each other, as well as other store instructions. By way of example, the first indexed load instruction 877 may be stored before the second indexed load instruction 878, the second indexed load instruction 878 may be stored before the third indexed load instruction 879, and the third indexed load instruction 879 may be stored before the fourth indexed load instruction 881. Also, the first indexed load instruction 877 may be stored after the prior store to memory instruction 876, and the intermittent store to memory instruction 880 may be stored between the third and fourth indexed load instructions 879, 881.

In some embodiments, a fourth memory ordering rule or semantic, which may optionally be used for the indexed load instructions, is that the component load operations (e.g., non-temporal load operations) that load the data elements for a contiguous set of one or more indexed load instructions are permitted to commence in any order (e.g., as if all of the component load operations were issued in parallel). By way of example, the component operations NTLW 1 through NTLW N for the first indexed load instruction 877, the component operations NTLW (N+1) through NTLW 2N for the second indexed load instruction 878, and the component operations NTLW (2N+1) through NTLW 3N for the third indexed load instruction 879, may all be permitted to commence in any order with respect to one another.

By way of example, one possible advantage of maintaining such memory consistency rules may be appreciated for an example cooperative use case in which a given thread gathers data for several client threads. The given thread may issue a contiguous sequence of indexed load instructions and would like to alert the client threads when the data has is available. If the indexed load instructions did not commit in order, then the given thread my need to read each destination to make sure they have all completed, since they may become readable only once they have completed. If the indexed load instructions committed in order, but did not commit in order with respect to other store instructions, then the given thread may want to issue a memory fence to help ensure that a subsequent store instruction performed to indicate availability of the data does not overtake the actual indexed load instructions being performed to collect the data. However, with the aforementioned memory consistency semantics, the given thread may merely issue the sequence of indexed load instructions, and then perform the subsequent store instruction to indicate availability of the data (e.g., by updating a flag). The store queue may help to ensure that the store operation to indicate availability of the data (e.g., the change to the flag) will only be observable after all of the prior indexed load instructions have committed.

In some embodiments, one or more of these memory ordering rules or semantics may optionally be implemented as architectural aspects or architectural implementations of the indexed load instructions, although this is not required. In such embodiments, the one or more memory ordering rules or semantics may be implicit or inherent to the indexed load instructions, and the processor may have logic to enforce the one or more memory ordering rules or semantics when performing the indexed load instructions. In other embodiments, one or more of these memory ordering rules or semantics may optionally not be implemented as architectural aspects or architectural implementations of the indexed load instructions. In such embodiments, additional instructions may be used to enforce the one or more memory ordering rules or semantics. For example, fence and/or barrier instructions (e.g., load fence instructions, store fence instructions, load and store fence instructions, etc.) may optionally be inserted between memory access instructions to enforce a memory ordering rule or semantic.

Figure 9:
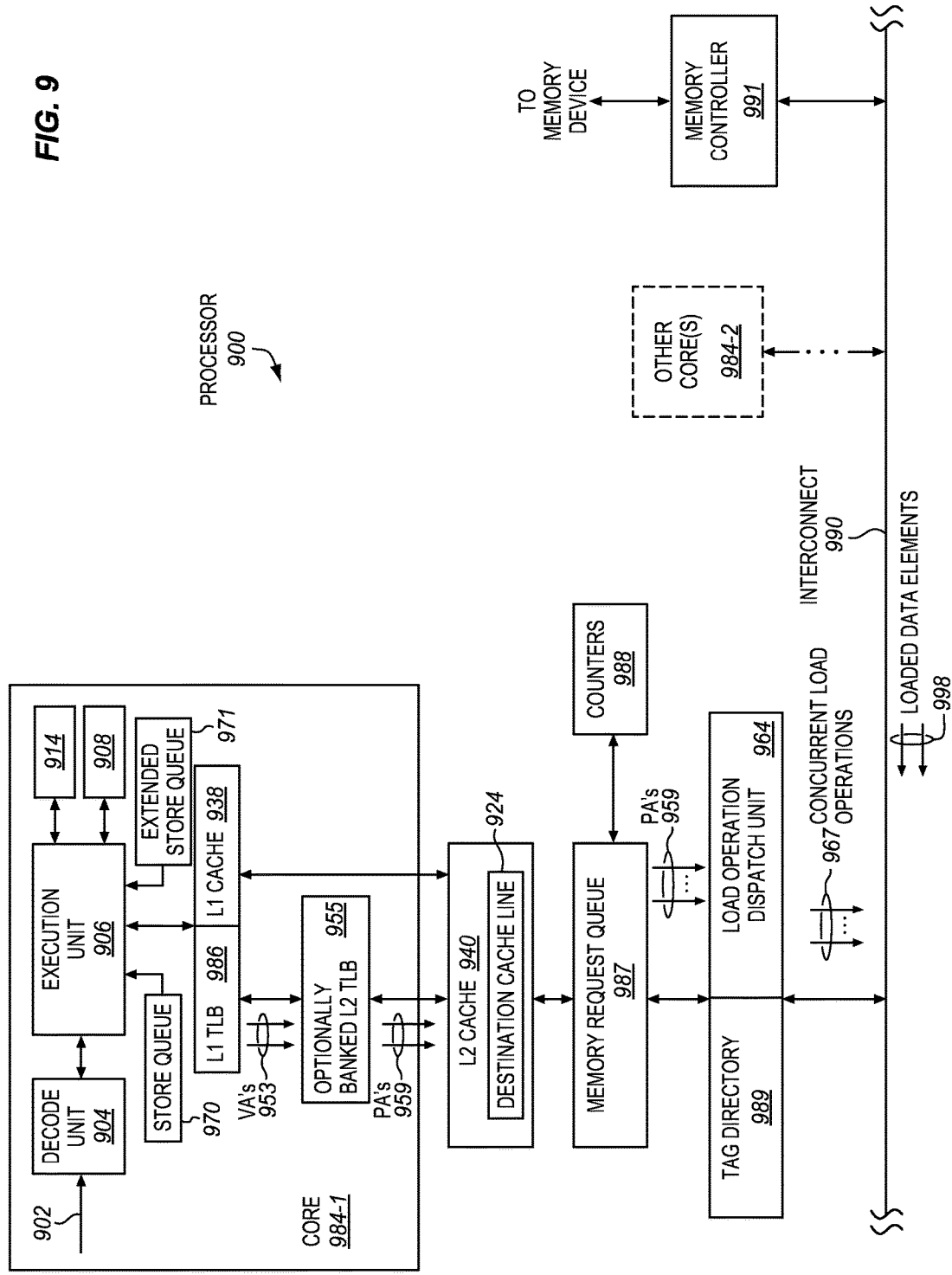
FIG. 9 is a block diagram of a detailed example embodiment of a processor that is operative to perform an embodiment of an indexed load instruction.

FIG. 9 is a block diagram of a detailed example embodiment of a processor 900 that is operative to perform an embodiment of an indexed load instruction 902. The processor includes at least a first core 984-1, and optionally one or more other cores 984-2. The processor also includes at least one memory controller 991 to couple to at least one corresponding memory device. An interconnect 990 (e.g., a full mesh interconnect, one or more ring interconnects, etc.) couples the first core, optionally the one or more other cores, and the at least one memory controller together.

The first core 984-1 includes a decode unit 904 to decode the indexed load instruction 902. The decode unit may provide instructions or control signals to implement the indexed load instruction. In some embodiments, initially the load queue may be drained of all previously issued loads. This may only happen once for a sequence of contiguous indexed load instructions.

An execution unit 906 is coupled with the decode unit. The execution unit may initiate performance of the indexed load instruction. The execution unit is coupled with a set of packed data registers 908, and a set of scalar registers 914. In some embodiments, a source packed memory address information operand of the indexed load instruction may be stored in and received from the packed data registers, and a destination memory address information of the indexed load instruction may be stored in and received from the scalar registers.

A first level or level 1 (L1) TLB 986 is coupled with the execution unit. The L1 TLB is coupled with a second level or level 2 (L2) TLB 955. The L1 TLB and/or the L2 TLB may be used to translate logical or logical memory addresses, which are derived from the source packed memory address information and the destination memory address information, to corresponding physical memory addresses. In some embodiments, the L2 TLB 955 may optionally be banked. In some embodiments, the optionally banked L2 TLB may be similar to or the same as the banked TLB of FIG. 5, although this is not required. In some embodiments, the banked L2 TLB may concurrently translate at least two or optionally all logical addresses 953, which are derived from the source packed memory address information, to at least two or optionally all corresponding physical addresses 959.

An L1 cache 938 is also coupled with the execution unit. An L2 cache 940 is coupled with the L1 cache. In some embodiments, a destination cache line 924 may optionally be allocated in the L2 cache for a destination physical memory address derived from the destination memory address information. Alternatively, other destination storage locations may optionally be used as described elsewhere herein. In some embodiments, the destination cache line may be configured to be unreadable and unevictable. Making the cache line unevictable may help to lock the cache line in the cache to prevent it from being evicted from the cache until after all of the associated load operations have been completed. Making the cache line unreadable may help to ensure that other entities do not read the cache line until after all of the associated load operations have been completed so that partially updated data is not read. If desired, a separate valid cache line copy for the same destination physical memory address may optionally be permitted to remain in the L2 cache at this time until all the load operations complete and the destination cache line is configured to be readable, although this is not required.

A memory request queue 987 is coupled with the L2 cache. The memory request queue may be operative to queue pending memory access requests. In some embodiments, at least one counter 988 may be coupled with the memory request queue 987. In some cases, there may optionally be a corresponding counter for each of one or more hardware threads of the first core 984-1. In some embodiments, the at least one counter may be operative to count or track the number of outstanding indexed load instructions whose component load operations have not yet been ordered at a tag directory 989. The tag directory may be operative to order the component load operations for the indexed load instructions. In some embodiments, the physical memory addresses corresponding to the source packed memory address information (e.g., the concurrently generated physical memory addresses 959) may be provided to the tag directory associated with the destination memory address.

A load operation dispatch unit 964 is coupled with the tag directory and the memory request queue. In some embodiments, the load operation dispatch unit may optionally be a concurrent load operation dispatch unit. The concurrent load operation dispatch unit may optionally be similar to or the same as that of FIG. 6. The concurrent load operation dispatch unit may be operative to concurrently dispatch at least two component load operations 967 for at least two associated input physical memory addresses 959. In some embodiments, component load operations may optionally be initiated or dispatched concurrently and/or in parallel for each of the different sets of memory address information in the source packed memory address information operand of the indexed load instruction. In some embodiments, each of the load operations may optionally be a non-temporal load then write (NTLW) operation which may bypass all caches (e.g., the L1 cache and L2 cache) with respect to the source memory addresses. This may help to reduce cache pollution in cases where the data being loaded has low spatial and/or temporal locality. In some embodiments, each of the load operations may indicate the destination storage location (e.g., indicate the core 984-1 as the destination core and indicate the set and way of the destination cache line 924). In some embodiments, each of the load operations may also indicate the corresponding lane of the result packed data and/or destination cache line where the loaded data element is to be stored.

When the tag directory 989 receives an acknowledgment from the other distributed tag directories associated with each load operation, it may send an acknowledgement back to the originating core. When the originating core receives this acknowledgment, it may decrement or otherwise decreases its count of outstanding indexed load instructions with as-yet-unordered load operations. In one aspect, the count of the outstanding indexed load instructions with as-yet-unordered load operations may be expected to become zero before retiring a load instruction. As another option, in another embodiment, all of the loads (the non-temporal loads) may be issued from entries in the memory request queue, and collapsed into one entry to receive the results, and from there into one response to be placed in the destination cache. This provides an alternative to using the concurrent load operation dispatch unit (e.g., loaded proximate the tag directories).

In some embodiments, loaded data elements 998 may be returned for the load operations 967. These loaded data elements may be returned using the destination storage location information conveyed with the load operations 967. These loaded data elements may be stored in their corresponding indicates lanes of the destination cache line 924.

The processor also includes a store queue 970. In some embodiments, the processor may also optionally include an extended store queue 971. In one aspect, these may be coupled with the execution unit 906. The extended store queue may be similar to or the same as that shown in FIG. 7, although this is not required. The extended store queue may be used to queue indexed load instructions. In some embodiments, the indexed load instruction may be represented by an entry in the extended store queue but may not consume any entries in the store queue. In some embodiments, the extended store queue may have relatively less logic per entry than the store queue. In some embodiments, when the indexed load instruction becomes the most senior store, in the store queue and the extended store queue, it may wait until all of its component load operations have been written into the destination cache line 924. Then, the memory request queue 987 may issue a command, such as, for example, a request for ownership, no data, full block write command, for the destination memory address. This may make the cache line readable. Then, the destination cache line 924 may be committed to memory, in some cases potentially destroying an existing copy in the same set.

In the description above, packed, vector, or indexed load instructions that have multiple source memory addresses have been described. In other embodiments, the techniques disclosed herein may optionally be used on scalar load instructions that have only a single scalar source memory address. For example, this may involve a non-temporal load of data and a write or store of the data to a destination location.

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to the Advanced Vector Extensions (AVX) (AVX1 and AVX2) and using the Vector Extensions (VEX) coding scheme, has been, has been released and/or published (e.g., see Intel® 64 and IA-32 Architectures Software Developers Manual, October 2011; and see Intel® Advanced Vector Extensions Programming Reference, June 2011).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

VEX Instruction Format

VEX encoding allows instructions to have more than two operands, and allows SIMD vector registers to be longer than 128 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 10A illustrates an exemplary AVX instruction format including a VEX prefix 1002, real opcode field 1030, Mod R/M byte 1040, SIB byte 1050, displacement field 1062, and IMM8 1072. FIG. 10B illustrates which fields from FIG. 10A make up a full opcode field 1074 and a base operation field 1042. FIG. 10C illustrates which fields from FIG. 10A make up a register index field 1044.

VEX Prefix (Bytes 0-2) 1002 is encoded in a three-byte form. The first byte is the Format Field 1040 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 1005 (VEX Byte 1, bits [7-5]) consists of a VEX.R bit field (VEX Byte 1, bit [7]—R), VEX.X bit field (VEX byte 1, bit [6]—X), and VEX.B bit field (VEX byte 1, bit[5]—B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 1015 (VEX byte 1, bits [4:0]—mmmmm) includes content to encode an implied leading opcode byte. W Field 1064 (VEX byte 2, bit [7]—W)—is represented by the notation VEX.W, and provides different functions depending on the instruction. The role of VEX.vvvv 1020 (VEX Byte 2, bits [6:3]—vvvv) may include the following: 1) VEX.vvvv encodes the first source register operand, specified in inverted (1s complement) form and is valid for instructions with 2 or more source operands; 2) VEX.vvvv encodes the destination register operand, specified in is complement form for certain vector shifts; or 3) VEX.vvvv does not encode any operand, the field is reserved and should contain 1011b. If VEX.L 1068 Size field (VEX byte 2, bit [2]—L)=0, it indicates 128 bit vector; if VEX.L=1, it indicates 256 bit vector. Prefix encoding field 1025 (VEX byte 2, bits [1:0]—pp) provides additional bits for the base operation field.

Real Opcode Field 1030 (Byte 3) is also known as the opcode byte. Part of the opcode is specified in this field.

MOD R/M Field 1040 (Byte 4) includes MOD field 1042 (bits [7-6]), Reg field 1044 (bits [5-3]), and R/M field 1046 (bits [2-0]). The role of Reg field 1044 may include the following: encoding either the destination register operand or a source register operand (the rrr of Rrrr), or be treated as an opcode extension and not used to encode any instruction operand. The role of R/M field 1046 may include the following: encoding the instruction operand that references a memory address, or encoding either the destination register operand or a source register operand.

Scale, Index, Base (SIB)—The content of Scale field 1050 (Byte 5) includes SS1052 (bits [7-6]), which is used for memory address generation. The contents of SIB.xxx 1054 (bits [5-3]) and SIB.bbb 1056 (bits [2-0]) have been previously referred to with regard to the register indexes Xxxx and Bbbb.

The Displacement Field 1062 and the immediate field (IMM8) 1072 contain address data.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 11A:
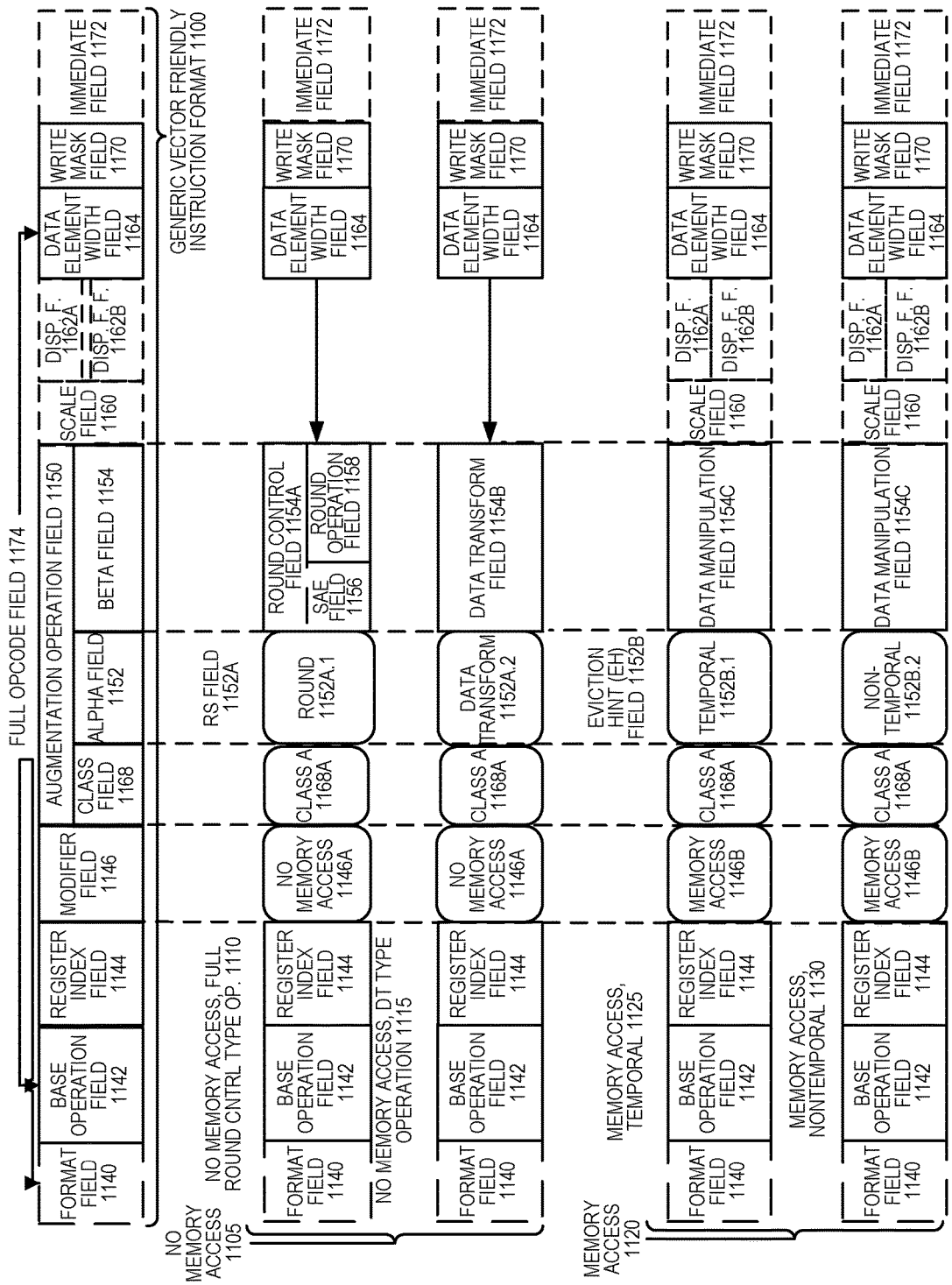
FIG. 11A-B is a block diagram illustrating an exemplary specific vector friendly instruction format and an opcode field, according to embodiments of the invention.
Figure 11B:
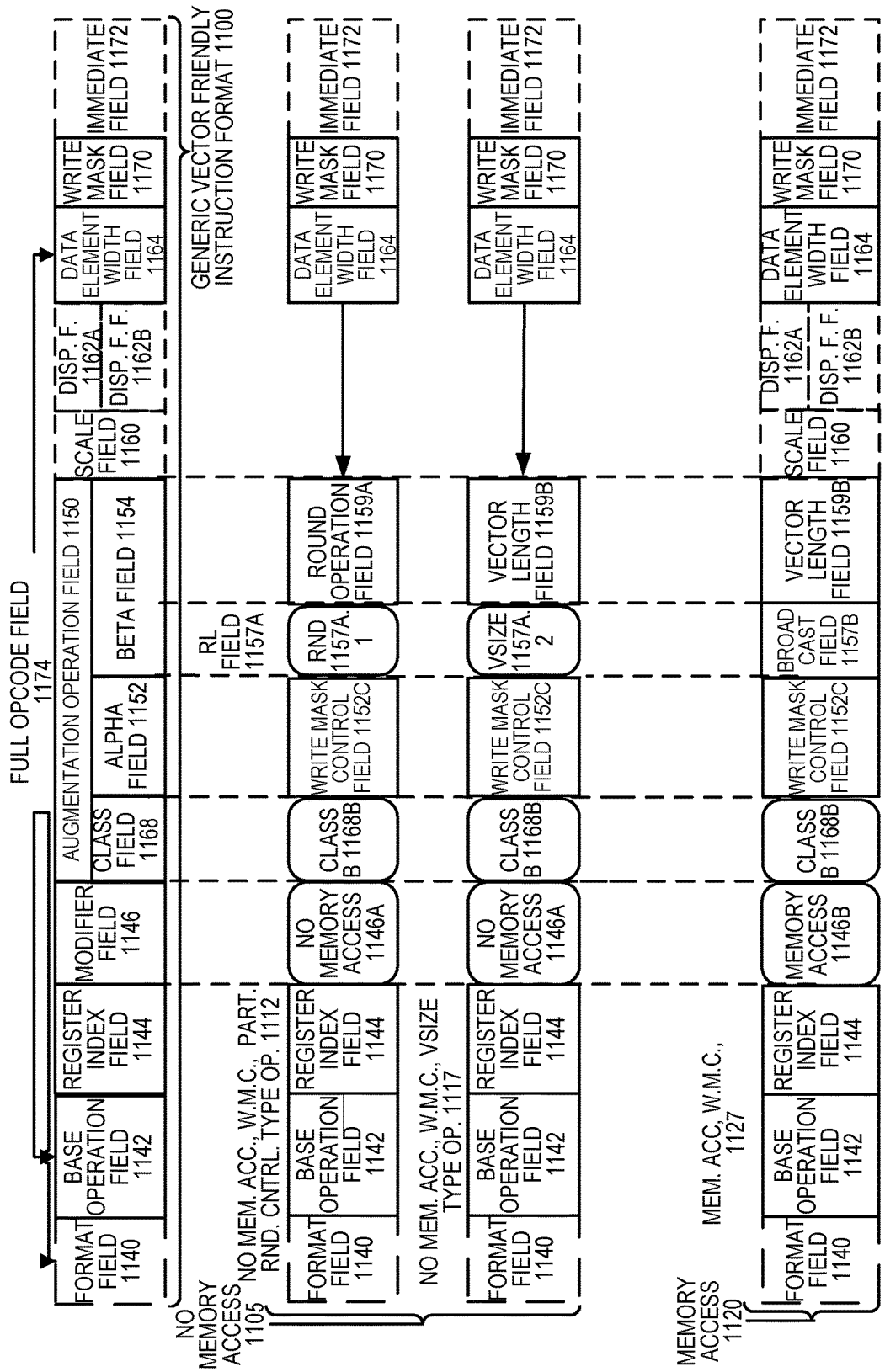

FIGS. 11A-11B are block diagrams illustrating a generic vector friendly instruction format and instruction templates thereof according to embodiments of the invention. FIG. 11A is a block diagram illustrating a generic vector friendly instruction format and class A instruction templates thereof according to embodiments of the invention; while FIG. 11B is a block diagram illustrating the generic vector friendly instruction format and class B instruction templates thereof according to embodiments of the invention. Specifically, a generic vector friendly instruction format 1100 for which are defined class A and class B instruction templates, both of which include no memory access 1105 instruction templates and memory access 1120 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 11A include: 1) within the no memory access 1105 instruction templates there is shown a no memory access, full round control type operation 1110 instruction template and a no memory access, data transform type operation 1115 instruction template; and 2) within the memory access 1120 instruction templates there is shown a memory access, temporal 1125 instruction template and a memory access, non-temporal 1130 instruction template. The class B instruction templates in FIG. 11B include: 1) within the no memory access 1105 instruction templates there is shown a no memory access, write mask control, partial round control type operation 1112 instruction template and a no memory access, write mask control, vsize type operation 1117 instruction template; and 2) within the memory access 1120 instruction templates there is shown a memory access, write mask control 1127 instruction template.

The generic vector friendly instruction format 1100 includes the following fields listed below in the order illustrated in FIGS. 11A-11B.

Format field 1140—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1142—its content distinguishes different base operations.

Register index field 1144—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1146—its content distinguishes occurrences of instructions in the generic vector instruction format that specify memory access from those that do not; that is, between no memory access 1105 instruction templates and memory access 1120 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1150—its content distinguishes which one of a variety of different operations to be performed in addition to the base operation. This field is context specific. In one embodiment of the invention, this field is divided into a class field 1168, an alpha field 1152, and a beta field 1154. The augmentation operation field 1150 allows common groups of operations to be performed in a single instruction rather than 2, 3, or 4 instructions.

Scale field 1160—its content allows for the scaling of the index field's content for memory address generation (e.g., for address generation that uses $2^{scale}*index+base$).

Displacement Field 1162A—its content is used as part of memory address generation (e.g., for address generation that uses $2^{scale}*index+base+displacement$).

Displacement Factor Field 1162B (note that the juxtaposition of displacement field 1162A directly over displacement factor field 1162B indicates one or the other is used)—its content is used as part of address generation; it specifies a displacement factor that is to be scaled by the size of a memory access (N)—where N is the number of bytes in the memory access (e.g., for address generation that uses $2^{scale}*index+base+scaled\ displacement$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1174 (described later herein) and the data manipulation field 1154C. The displacement field 1162A and the displacement factor field 1162B are optional in the sense that they are not used for the no memory access 1105 instruction templates and/or different embodiments may implement only one or none of the two.

Data element width field 1164—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1170—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1170 allows for partial vector operations, including loads, stores, arithmetic, logical, etc. While embodiments of the invention are described in which the write mask field's 1170 content selects one of a number of write mask registers that contains the write mask to be used (and thus the write mask field's 1170 content indirectly identifies that masking to be performed), alternative embodiments instead or additional allow the mask write field's 1170 content to directly specify the masking to be performed.

Immediate field 1172—its content allows for the specification of an immediate. This field is optional in the sense that is it not present in an implementation of the generic vector friendly format that does not support immediate and it is not present in instructions that do not use an immediate.

Class field 1168—its content distinguishes between different classes of instructions. With reference to FIGS. 11A-B, the contents of this field select between class A and class B instructions. In FIGS. 11A-B, rounded corner squares are used to indicate a specific value is present in a field (e.g., class A 1168A and class B 1168B for the class field 1168 respectively in FIGS. 11A-B).

Instruction Templates of Class A

In the case of the non-memory access 1105 instruction templates of class A, the alpha field 1152 is interpreted as an RS field 1152A, whose content distinguishes which one of the different augmentation operation types are to be performed (e.g., round 1152A.1 and data transform 1152A.2 are respectively specified for the no memory access, round type operation 1110 and the no memory access, data transform type operation 1115 instruction templates), while the beta field 1154 distinguishes which of the operations of the specified type is to be performed. In the no memory access 1105 instruction templates, the scale field 1160, the displacement field 1162A, and the displacement scale filed 1162B are not present.

No-Memory Access Instruction Templates—Full Round Control Type Operation

In the no memory access full round control type operation 1110 instruction template, the beta field 1154 is interpreted as a round control field 1154A, whose content(s) provide static rounding. While in the described embodiments of the invention the round control field 1154A includes a suppress all floating point exceptions (SAE) field 1156 and a round operation control field 1158, alternative embodiments may support may encode both these concepts into the same field or only have one or the other of these concepts/fields (e.g., may have only the round operation control field 1158).

SAE field 1156—its content distinguishes whether or not to disable the exception event reporting; when the SAE field's 1156 content indicates suppression is enabled, a given instruction does not report any kind of floating-point exception flag and does not raise any floating point exception handler.

Round operation control field 1158—its content distinguishes which one of a group of rounding operations to perform (e.g., Round-up, Round-down, Round-towards-zero and Round-to-nearest). Thus, the round operation control field 1158 allows for the changing of the rounding mode on a per instruction basis. In one embodiment of the invention where a processor includes a control register for specifying rounding modes, the round operation control field's 1150 content overrides that register value.

No Memory Access Instruction Templates—Data Transform Type Operation

In the no memory access data transform type operation 1115 instruction template, the beta field 1154 is interpreted as a data transform field 1154B, whose content distinguishes which one of a number of data transforms is to be performed (e.g., no data transform, swizzle, broadcast).

In the case of a memory access 1120 instruction template of class A, the alpha field 1152 is interpreted as an eviction hint field 1152B, whose content distinguishes which one of the eviction hints is to be used (in FIG. 11A, temporal 1152B.1 and non-temporal 1152B.2 are respectively specified for the memory access, temporal 1125 instruction template and the memory access, non-temporal 1130 instruction template), while the beta field 1154 is interpreted as a data manipulation field 1154C, whose content distinguishes which one of a number of data manipulation operations (also known as primitives) is to be performed (e.g., no manipulation; broadcast; up conversion of a source; and down conversion of a destination). The memory access 1120 instruction templates include the scale field 1160, and optionally the displacement field 1162A or the displacement scale field 1162B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1152 is interpreted as a write mask control (Z) field 1152C, whose content distinguishes whether the write masking controlled by the write mask field 1170 should be a merging or a zeroing.

In the case of the non-memory access 1105 instruction templates of class B, part of the beta field 1154 is interpreted as an RL field 1157A, whose content distinguishes which one of the different augmentation operation types are to be performed (e.g., round 1157A.1 and vector length (VSIZE) 1157A.2 are respectively specified for the no memory access, write mask control, partial round control type operation 1112 instruction template and the no memory access, write mask control, VSIZE type operation 1117 instruction template), while the rest of the beta field 1154 distinguishes which of the operations of the specified type is to be performed. In the no memory access 1105 instruction templates, the scale field 1160, the displacement field 1162A, and the displacement scale filed 1162B are not present.

In the no memory access, write mask control, partial round control type operation 1110 instruction template, the rest of the beta field 1154 is interpreted as a round operation field 1159A and exception event reporting is disabled (a given instruction does not report any kind of floating-point exception flag and does not raise any floating point exception handler).

Round operation control field 1159A—just as round operation control field 1158, its content distinguishes which one of a group of rounding operations to perform (e.g., Round-up, Round-down, Round-towards-zero and Round-to-nearest). Thus, the round operation control field 1159A allows for the changing of the rounding mode on a per instruction basis. In one embodiment of the invention where a processor includes a control register for specifying rounding modes, the round operation control field's 1150 content overrides that register value.

In the no memory access, write mask control, VSIZE type operation 1117 instruction template, the rest of the beta field 1154 is interpreted as a vector length field 1159B, whose content distinguishes which one of a number of data vector lengths is to be performed on (e.g., 128, 256, or 512 byte).

In the case of a memory access 1120 instruction template of class B, part of the beta field 1154 is interpreted as a broadcast field 1157B, whose content distinguishes whether or not the broadcast type data manipulation operation is to be performed, while the rest of the beta field 1154 is interpreted the vector length field 1159B. The memory access 1120 instruction templates include the scale field 1160, and optionally the displacement field 1162A or the displacement scale field 1162B.

With regard to the generic vector friendly instruction format 1100, a full opcode field 1174 is shown including the format field 1140, the base operation field 1142, and the data element width field 1164. While one embodiment is shown where the full opcode field 1174 includes all of these fields, the full opcode field 1174 includes less than all of these fields in embodiments that do not support all of them. The full opcode field 1174 provides the operation code (opcode).

The augmentation operation field 1150, the data element width field 1164, and the write mask field 1170 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 12 is a block diagram illustrating an exemplary specific vector friendly instruction format according to embodiments of the invention. FIG. 12 shows a specific vector friendly instruction format 1200 that is specific in the sense that it specifies the location, size, interpretation, and order of the fields, as well as values for some of those fields. The specific vector friendly instruction format 1200 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 11 into which the fields from FIG. 12 map are illustrated.

It should be understood that, although embodiments of the invention are described with reference to the specific vector friendly instruction format 1200 in the context of the generic vector friendly instruction format 1100 for illustrative purposes, the invention is not limited to the specific vector friendly instruction format 1200 except where claimed. For example, the generic vector friendly instruction format 1100 contemplates a variety of possible sizes for the various fields, while the specific vector friendly instruction format 1200 is shown as having fields of specific sizes. By way of specific example, while the data element width field 1164 is illustrated as a one bit field in the specific vector friendly instruction format 1200, the invention is not so limited (that is, the generic vector friendly instruction format 1100 contemplates other sizes of the data element width field 1164).

The generic vector friendly instruction format 1100 includes the following fields listed below in the order illustrated in FIG. 12A.

EVEX Prefix (Bytes 0-3) 1202—is encoded in a four-byte form.

Format Field 1140 (EVEX Byte 0, bits [7:0])—the first byte (EVEX Byte 0) is the format field 1140 and it contains 0x62 (the unique value used for distinguishing the vector friendly instruction format in one embodiment of the invention).

The second-fourth bytes (EVEX Bytes 1-3) include a number of bit fields providing specific capability.

REX field 1205 (EVEX Byte 1, bits [7-5])—consists of a EVEX.R bit field (EVEX Byte 1, bit [7]—R), EVEX.X bit field (EVEX byte 1, bit [6]—X), and 1157BEX byte 1, bit[5]—B). The EVEX.R, EVEX.X, and EVEX.B bit fields provide the same functionality as the corresponding VEX bit fields, and are encoded using is complement form, i.e. ZMM0 is encoded as 1011B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1110—this is the first part of the REX' field 1110 and is the EVEX.R' bit field (EVEX Byte 1, bit [4]—R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1215 (EVEX byte 1, bits [3:0]—mmmm)—its content encodes an implied leading opcode byte (0F, 0F 38, or 0F 3).

Data element width field 1164 (EVEX byte 2, bit [7]—W)—is represented by the notation EVEX.W. EVEX.W is used to define the granularity (size) of the datatype (either 32-bit data elements or 64-bit data elements).

EVEX.vvvv 1220 (EVEX Byte 2, bits [6:3]—vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1011b. Thus, EVEX.vvvv field 1220 encodes the 4 low-order bits of the first source register specifier stored in inverted (1s complement) form. Depending on the instruction, an extra different EVEX bit field is used to extend the specifier size to 32 registers.

EVEX.0 1168 Class field (EVEX byte 2, bit [2]—U)—If EVEX.0=0, it indicates class A or EVEX.U0; if EVEX.0=1, it indicates class B or EVEX.U1.

Prefix encoding field 1225 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1152 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 1154 (EVEX byte 3, bits [6:4]—SSS, also known as $EVEX.s_{2-0}$, $EVEX.r_{2-0}$, EVEX.rr1, EVEX.LL0, EVEX.LLB; also illustrated with βββ)—as previously described, this field is context specific.

REX' field 1110—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1170 (EVEX byte 3, bits [2:0]—kkk)—its content specifies the index of a register in the write mask registers as previously described. In one embodiment of the invention, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 1230 (Byte 4) is also known as the opcode byte. Part of the opcode is specified in this field.

MOD R/M Field 1240 (Byte 5) includes MOD field 1242, Reg field 1244, and R/M field 1246. As previously described, the MOD field's 1242 content distinguishes between memory access and non-memory access operations. The role of Reg field 1244 can be summarized to two situations: encoding either the destination register operand or a source register operand, or be treated as an opcode extension and not used to encode any instruction operand. The role of R/M field 1246 may include the following: encoding the instruction operand that references a memory address, or encoding either the destination register operand or a source register operand.

Scale, Index, Base (SIB) Byte (Byte 6)—As previously described, the scale field's 1150 content is used for memory address generation. SIB.xxx 1254 and SIB.bbb 1256—the contents of these fields have been previously referred to with regard to the register indexes Xxxx and Bbbb.

Displacement field 1162A (Bytes 7-10)—when MOD field 1242 contains 10, bytes 7-10 are the displacement field 1162A, and it works the same as the legacy 32-bit displacement (disp32) and works at byte granularity.

Displacement factor field 1162B (Byte 7)—when MOD field 1242 contains 01, byte 7 is the displacement factor field 1162B. The location of this field is that same as that of the legacy x86 instruction set 8-bit displacement (disp8), which works at byte granularity. Since disp8 is sign extended, it can only address between −128 and 117 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1162B is a reinterpretation of disp8; when using displacement factor field 1162B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1162B substitutes the legacy x86 instruction set 8-bit displacement. Thus, the displacement factor field 1162B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate field 1172 operates as previously described.

Full Opcode Field

FIG. 12B is a block diagram illustrating the fields of the specific vector friendly instruction format 1200 that make up the full opcode field 1174 according to one embodiment of the invention. Specifically, the full opcode field 1174 includes the format field 1140, the base operation field 1142, and the data element width (W) field 1164. The base operation field 1142 includes the prefix encoding field 1225, the opcode map field 1215, and the real opcode field 1230.

Register Index Field

FIG. 12C is a block diagram illustrating the fields of the specific vector friendly instruction format 1200 that make up the register index field 1144 according to one embodiment of the invention. Specifically, the register index field 1144 includes the REX field 1205, the REX' field 1210, the MODR/M.reg field 1244, the MODR/M.r/m field 1246, the VVVV field 1220, xxx field 1254, and the bbb field 1256.

Augmentation Operation Field

Figure 12D:
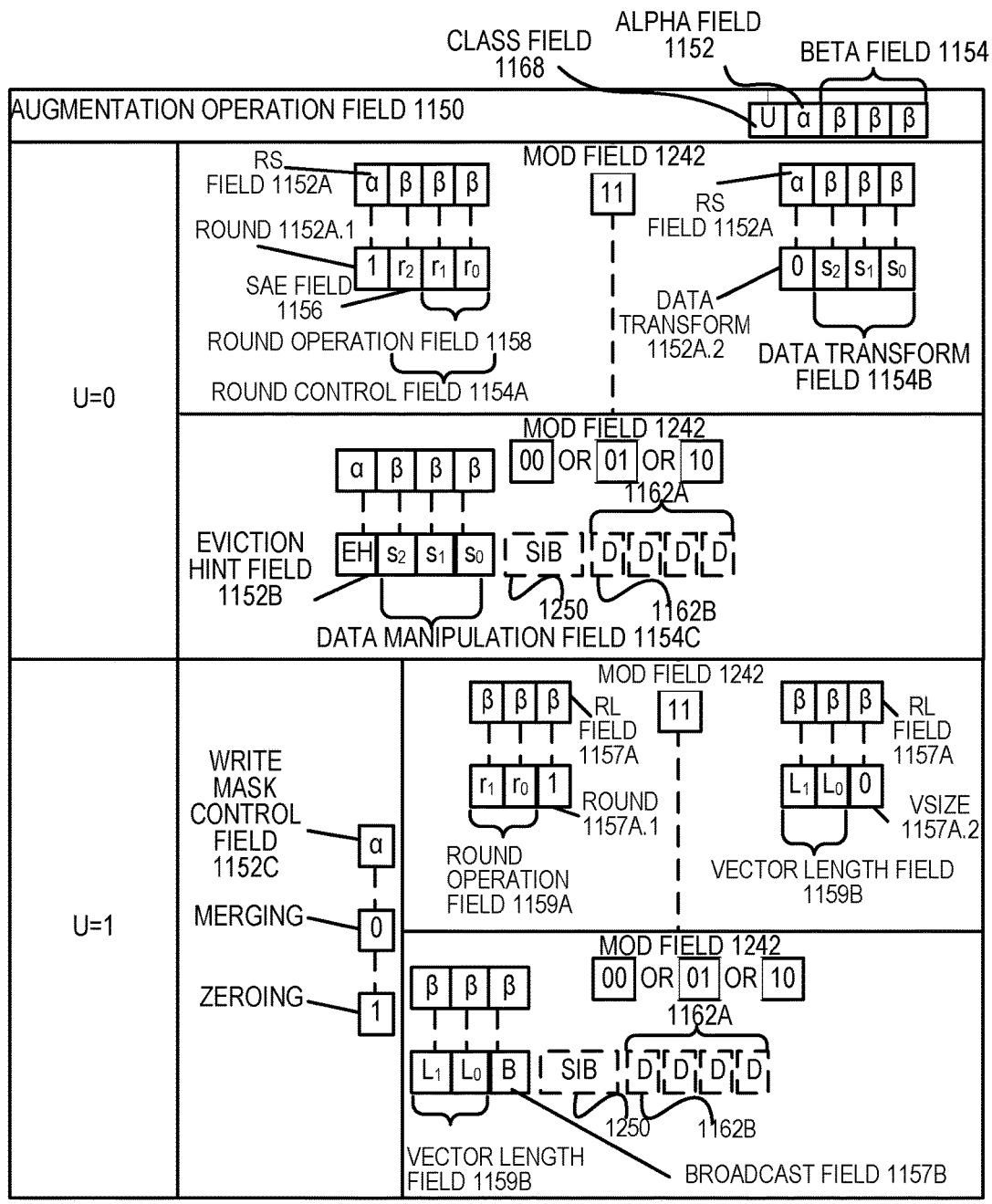

FIG. 12D is a block diagram illustrating the fields of the specific vector friendly instruction format 1200 that make up the augmentation operation field 1150 according to one embodiment of the invention. When the class (U) field 1168 contains 0, it signifies EVEX.U0 (class A 1168A); when it contains 1, it signifies EVEX.U1 (class B 1168B). When U=0 and the MOD field 1242 contains 11 (signifying a no memory access operation), the alpha field 1152 (EVEX byte 3, bit [7]—EH) is interpreted as the rs field 1152A. When the rs field 1152A contains a 1 (round 1152A.1), the beta field 1154 (EVEX byte 3, bits [6:4]—SSS) is interpreted as the round control field 1154A. The round control field 1154A includes a one bit SAE field 1156 and a two bit round operation field 1158. When the rs field 1152A contains a 0 (data transform 1152A.2), the beta field 1154 (EVEX byte 3, bits [6:4]—SSS) is interpreted as a three bit data transform field 1154B. When U=0 and the MOD field 1242 contains 00, 01, or 10 (signifying a memory access operation), the alpha field 1152 (EVEX byte 3, bit [7]—EH) is interpreted as the eviction hint (EH) field 1152B and the beta field 1154 (EVEX byte 3, bits [6:4]—SSS) is interpreted as a three bit data manipulation field 1154C.

When U=1, the alpha field 1152 (EVEX byte 3, bit [7]—EH) is interpreted as the write mask control (Z) field 1152C. When U=1 and the MOD field 1242 contains 11 (signifying a no memory access operation), part of the beta field 1154 (EVEX byte 3, bit [4]—S$_0$) is interpreted as the RL field 1157A; when it contains a 1 (round 1157A.1) the rest of the beta field 1154 (EVEX byte 3, bit [6-5]—S$_{2-1}$) is interpreted as the round operation field 1159A, while when the RL field 1157A contains a 0 (VSIZE 1157.A2) the rest of the beta field 1154 (EVEX byte 3, bit [6-5]—S$_{2-1}$) is interpreted as the vector length field 1159B (EVEX byte 3, bit [6-5]—L$_{1-0}$). When U=1 and the MOD field 1242 contains 00, 01, or 10 (signifying a memory access operation), the beta field 1154 (EVEX byte 3, bits [6:4]—SSS) is interpreted as the vector length field 1159B (EVEX byte 3, bit [6-5]—L$_{1-0}$) and the broadcast field 1157B (EVEX byte 3, bit [4]—B).

Exemplary Register Architecture

Figure 13:
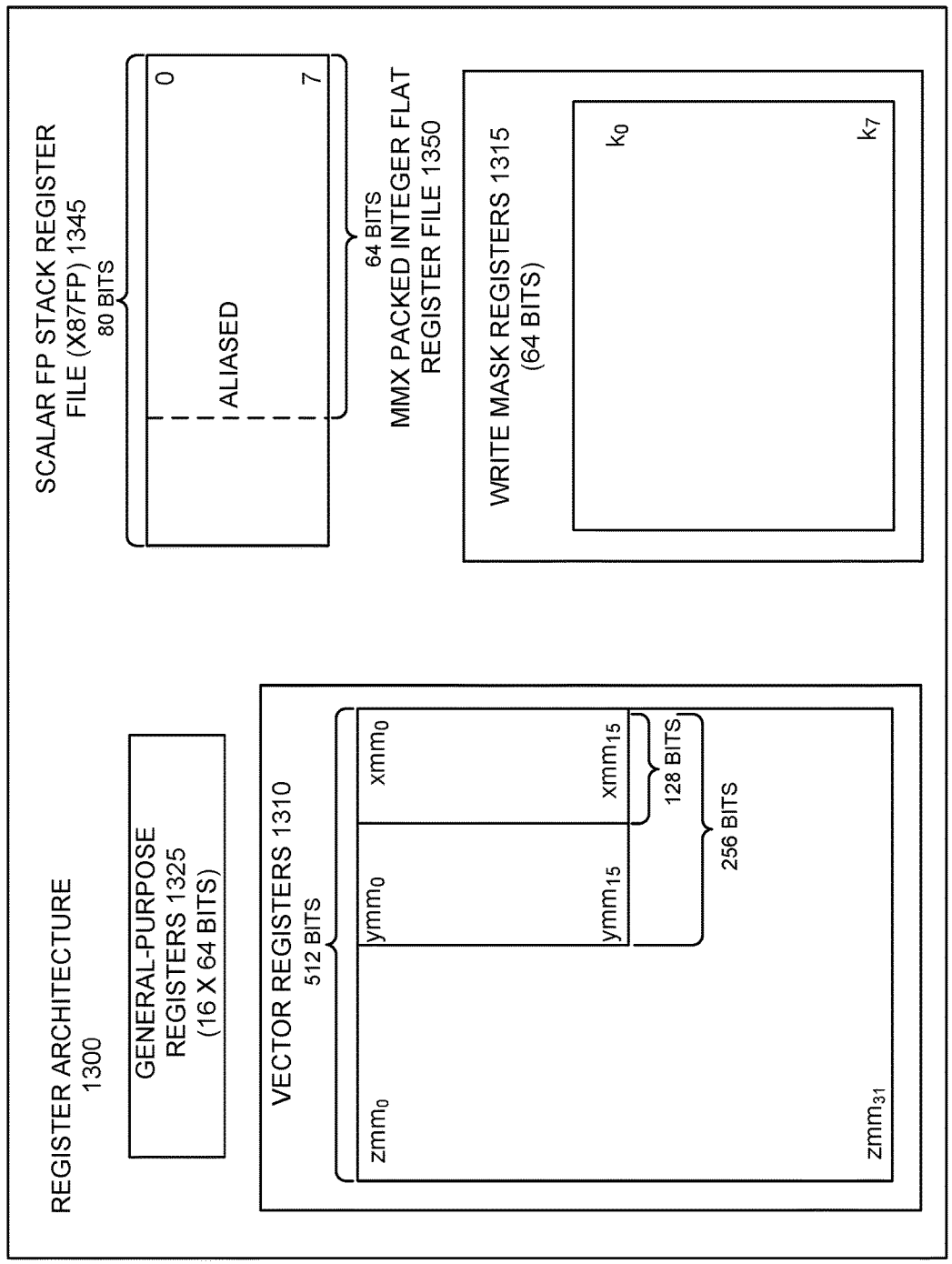
FIG. 13 is a block diagram of an embodiment of a register architecture.

FIG. 13 is a block diagram of a register architecture 1300 according to one embodiment of the invention. In the embodiment illustrated, there are 32 vector registers 1310 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1200 operates on these overlaid register file as illustrated in the below tables.

| Adjustable Vector Length | Class | Operations | Registers |
| --- | --- | --- | --- |
| Instruction Templates that do not include the vector length field 1159B | A (FIG. 11A; U = 0) | 1110, 1115, 1125, 1130 | zmm registers (the vector length is 64 byte) |
| | B (FIG. 11B; U = 1) | 1112 | zmm registers (the vector length is 64 byte) |
| Instruction templates that do include the vector length field 1159B | B (FIG. 11B; U = 1) | 1117, 1127 | zmm, ymm, or xmm registers (the vector length is 64 byte, 32 byte, or 16 byte) depending on the vector length field 1159B |

In other words, the vector length field 1159B selects between a maximum length and one or more other shorter lengths, where each such shorter length is half the length of the preceding length; and instructions templates without the vector length field 1159B operate on the maximum vector length. Further, in one embodiment, the class B instruction templates of the specific vector friendly instruction format 1200 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1315—in the embodiment illustrated, there are 8 write mask registers (k0 through k7), each 64 bits in size. In an alternate embodiment, the write mask registers 1315 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1325—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1345, on which is aliased the MMX packed integer flat register file 1350—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

Figures 14A, 14B:
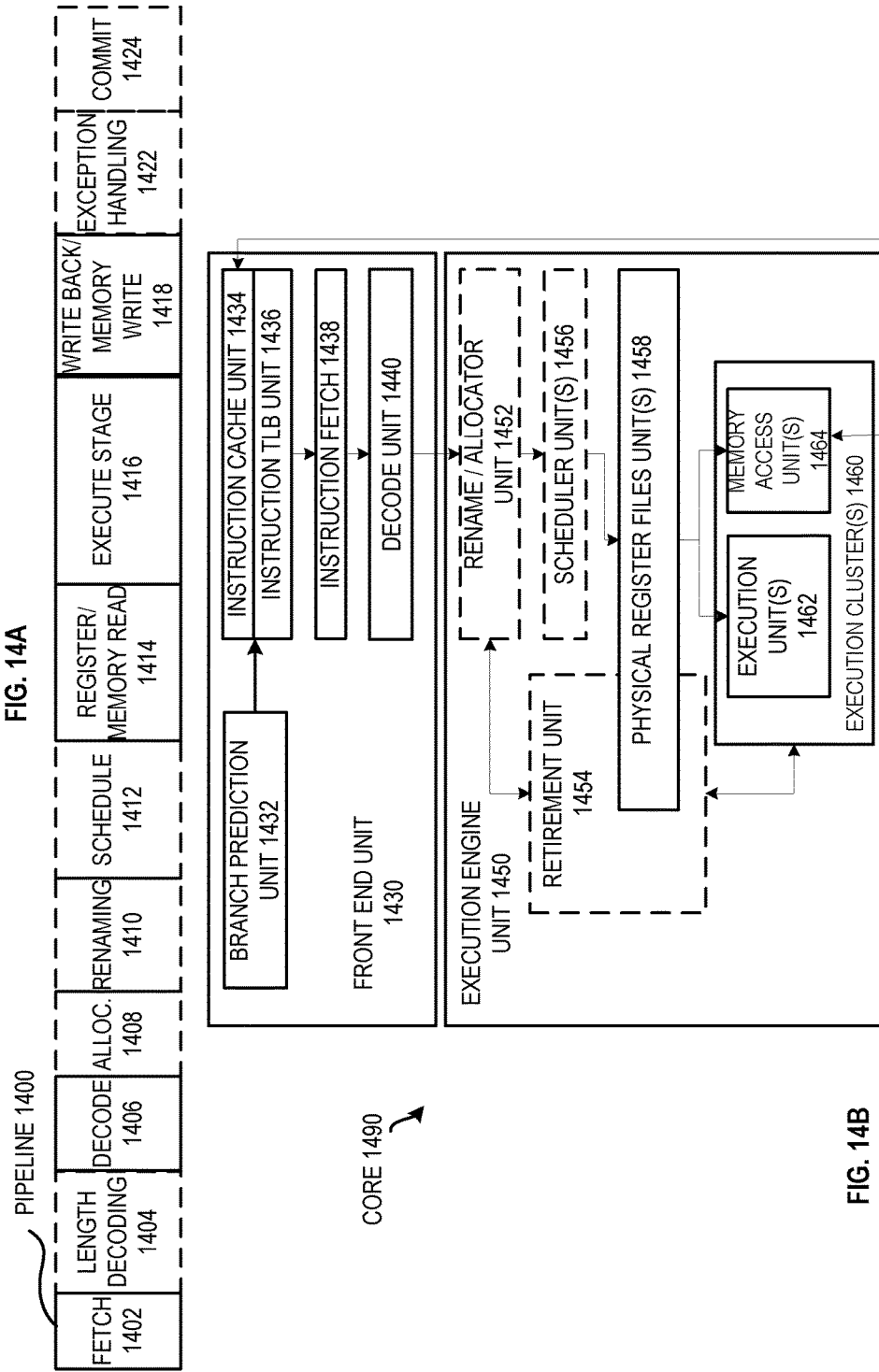
FIG. 14A is a block diagram illustrating an embodiment of an in-order pipeline and an embodiment of a register renaming out-of-order issue/execution pipeline.
FIG. 14B is a block diagram of an embodiment of processor core including a front end unit coupled to an execution engine unit and both coupled to a memory unit.

FIG. 14A is a block diagram illustrating both an exemplary in-order pipeline and an exemplary register renaming, out-of-order issue/execution pipeline according to embodiments of the invention. FIG. 14B is a block diagram illustrating both an exemplary embodiment of an in-order architecture core and an exemplary register renaming, out-of-order issue/execution architecture core to be included in a processor according to embodiments of the invention. The solid lined boxes in FIGS. 14A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 14A, a processor pipeline 1400 includes a fetch stage 1402, a length decode stage 1404, a decode stage 1406, an allocation stage 1408, a renaming stage 1410, a scheduling (also known as a dispatch or issue) stage 1412, a register read/memory read stage 1414, an execute stage 1416, a write back/memory write stage 1418, an exception handling stage 1422, and a commit stage 1424.

FIG. 14B shows processor core 1490 including a front end unit 1430 coupled to an execution engine unit 1450, and both are coupled to a memory unit 1470. The core 1490 may be a reduced instruction set computing (RISC) core, a complex instruction set computing (CISC) core, a very long instruction word (VLIW) core, or a hybrid or alternative core type. As yet another option, the core 1490 may be a special-purpose core, such as, for example, a network or communication core, compression engine, coprocessor core, general purpose computing graphics processing unit (GPGPU) core, graphics core, or the like.

The front end unit 1430 includes a branch prediction unit 1432 coupled to an instruction cache unit 1434, which is coupled to an instruction translation lookaside buffer (TLB) 1436, which is coupled to an instruction fetch unit 1438, which is coupled to a decode unit 1440. The decode unit 1440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1490 includes a microcode ROM or other medium that stores microcode for certain macroinstructions (e.g., in decode unit 1440 or otherwise within the front end unit 1430). The decode unit 1440 is coupled to a rename/allocator unit 1452 in the execution engine unit 1450.

The execution engine unit 1450 includes the rename/allocator unit 1452 coupled to a retirement unit 1454 and a set of one or more scheduler unit(s) 1456. The scheduler unit(s) 1456 represents any number of different schedulers, including reservations stations, central instruction window, etc. The scheduler unit(s) 1456 is coupled to the physical register file(s) unit(s) 1458. Each of the physical register file(s) units 1458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1458 comprises a vector registers unit, a write mask registers unit, and a scalar registers unit. These register units may provide architectural vector registers, vector mask registers, and general purpose registers. The physical register file(s) unit(s) 1458 is overlapped by the retirement unit 1454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1454 and the physical register file(s) unit(s) 1458 are coupled to the execution cluster(s) 1460. The execution cluster(s) 1460 includes a set of one or more execution units 1462 and a set of one or more memory access units 1464. The execution units 1462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1456, physical register file(s) unit(s) 1458, and execution cluster(s) 1460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1464). It should also be understood that where separate pipelines are used, one or more of these pipelines may be out-of-order issue/execution and the rest in-order.

The set of memory access units 1464 is coupled to the memory unit 1470, which includes a data TLB unit 1472 coupled to a data cache unit 1474 coupled to a level 2 (L2) cache unit 1476. In one exemplary embodiment, the memory access units 1464 may include a load unit, a store address unit, and a store data unit, each of which is coupled to the data TLB unit 1472 in the memory unit 1470. The instruction cache unit 1434 is further coupled to a level 2 (L2) cache unit 1476 in the memory unit 1470. The L2 cache unit 1476 is coupled to one or more other levels of cache and eventually to a main memory.

By way of example, the exemplary register renaming, out-of-order issue/execution core architecture may implement the pipeline 1400 as follows: 1) the instruction fetch 1438 performs the fetch and length decoding stages 1402 and 1404; 2) the decode unit 1440 performs the decode stage 1406; 3) the rename/allocator unit 1452 performs the allocation stage 1408 and renaming stage 1410; 4) the scheduler unit(s) 1456 performs the schedule stage 1412; 5) the physical register file(s) unit(s) 1458 and the memory unit 1470 perform the register read/memory read stage 1414; the execution cluster 1460 perform the execute stage 1416; 6) the memory unit 1470 and the physical register file(s) unit(s) 1458 perform the write back/memory write stage 1418; 7) various units may be involved in the exception handling stage 1422; and 8) the retirement unit 1454 and the physical register file(s) unit(s) 1458 perform the commit stage 1424.

The core 1490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1434/1474 and a shared L2 cache unit 1476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 15B:
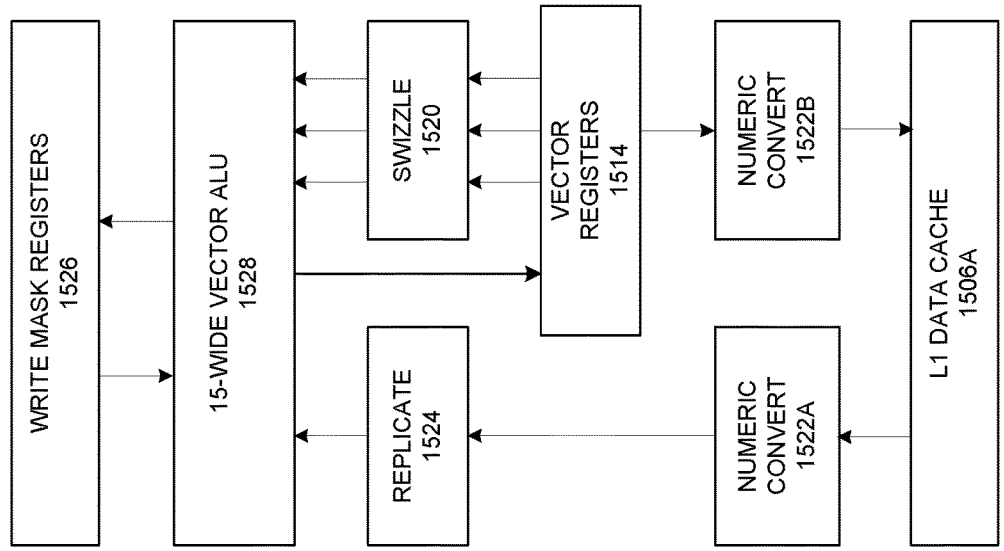
FIG. 15B is a block diagram of an embodiment of an expanded view of part of the processor core of FIG. 15A.
Figure 15A:
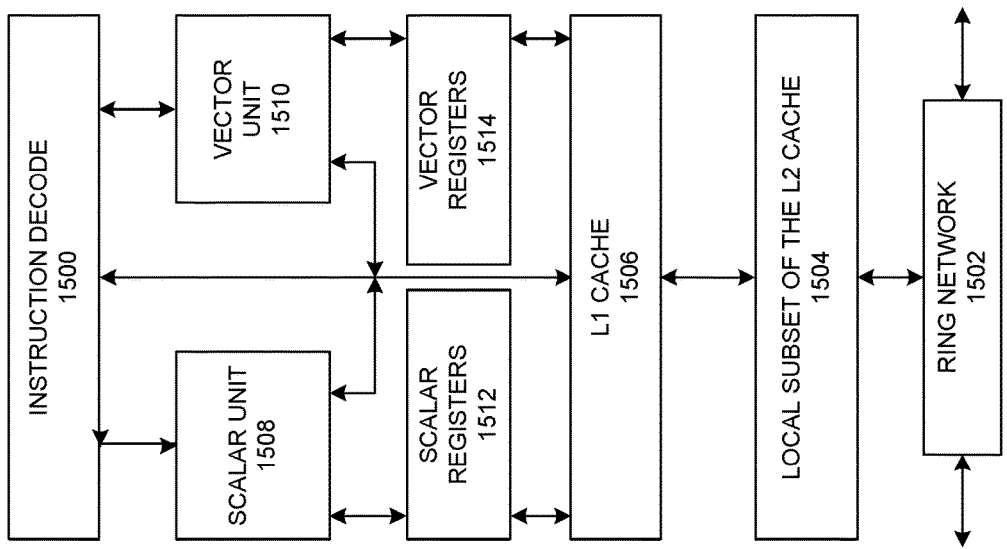
FIG. 15A is a block diagram of an embodiment of a single processor core, along with its connection to the on-die interconnect network, and with its local subset of the Level 2 (L2) cache.

FIGS. 15A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 15A is a block diagram of a single processor core, along with its connection to the on-die interconnect network 1502 and with its local subset of the Level 2 (L2) cache 1504, according to embodiments of the invention. In one embodiment, an instruction decoder 1500 supports the x86 instruction set with a packed data instruction set extension. An L1 cache 1506 allows low-latency accesses to cache memory into the scalar and vector units. While in one embodiment (to simplify the design), a scalar unit 1508 and a vector unit 1510 use separate register sets (respectively, scalar registers 11512 and vector registers 1514) and data transferred between them is written to memory and then read back in from a level 1 (L1) cache 1506, alternative embodiments of the invention may use a different approach (e.g., use a single register set or include a communication path that allow data to be transferred between the two register files without being written and read back).

The local subset of the L2 cache 1504 is part of a global L2 cache that is divided into separate local subsets, one per processor core. Each processor core has a direct access path to its own local subset of the L2 cache 1504. Data read by a processor core is stored in its L2 cache subset 1504 and can be accessed quickly, in parallel with other processor cores accessing their own local L2 cache subsets. Data written by a processor core is stored in its own L2 cache subset 1504 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 15B is an expanded view of part of the processor core in FIG. 15A according to embodiments of the invention. FIG. 15B includes an L1 data cache 1506A part of the L1 cache 1504, as well as more detail regarding the vector unit 1510 and the vector registers 1514. Specifically, the vector unit 1510 is a 16-wide vector processing unit (VPU) (see the 16-wide ALU 1528), which executes one or more of integer, single-precision float, and double-precision float instructions. The VPU supports swizzling the register inputs with swizzle unit 1520, numeric conversion with numeric convert units 1522A-B, and replication with replication unit 1524 on the memory input. Write mask registers 1526 allow predicating resulting vector writes.

Processor with Integrated Memory Controller and Graphics

Figure 16:
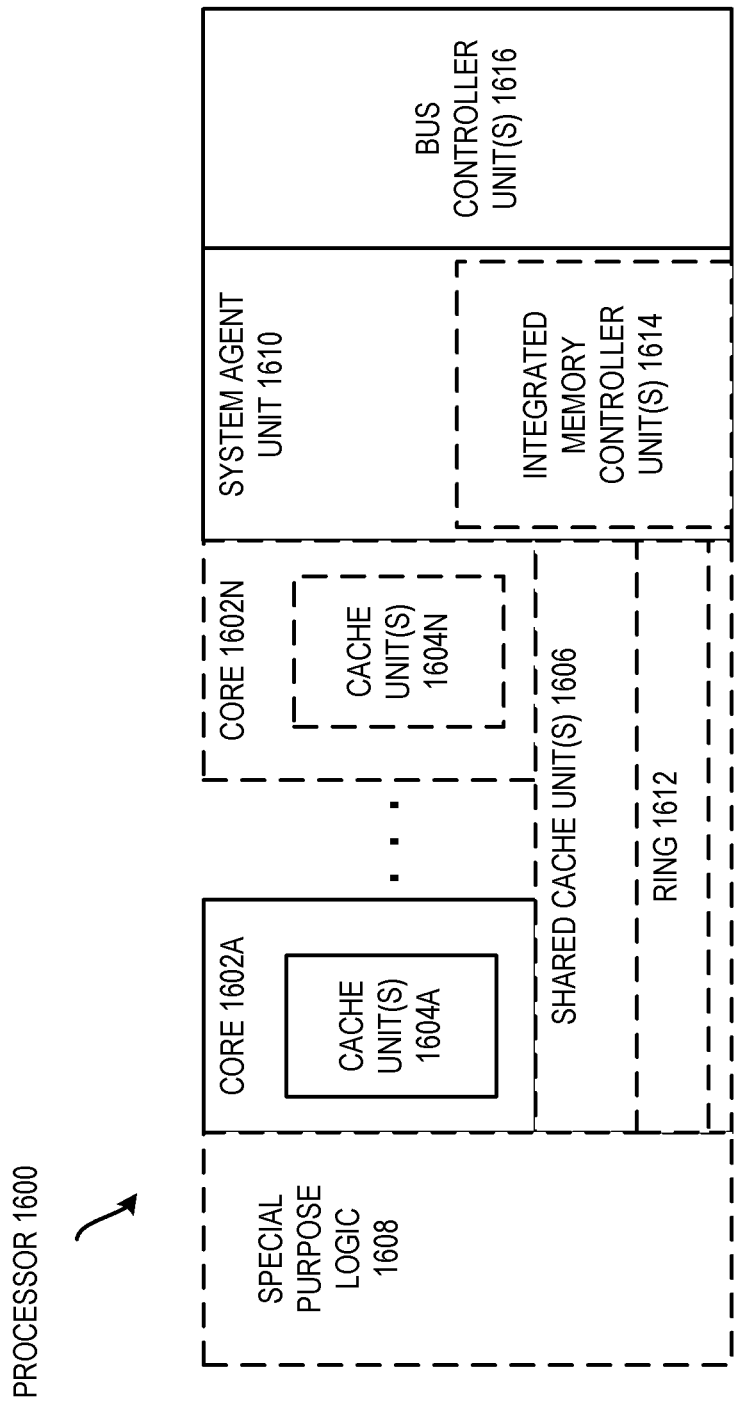
FIG. 16 is a block diagram of an embodiment of a processor that may have more than one core, may have an integrated memory controller, and may have integrated graphics.

FIG. 16 is a block diagram of a processor 1600 that may have more than one core, may have an integrated memory controller, and may have integrated graphics according to embodiments of the invention. The solid lined boxes in FIG. 16 illustrate a processor 1600 with a single core 1602A, a system agent 1610, a set of one or more bus controller units 1616, while the optional addition of the dashed lined boxes illustrates an alternative processor 1600 with multiple cores 1602A-N, a set of one or more integrated memory controller unit(s) 1614 in the system agent unit 1610, and special purpose logic 1608.

Thus, different implementations of the processor 1600 may include: 1) a CPU with the special purpose logic 1608 being integrated graphics and/or scientific (throughput) logic (which may include one or more cores), and the cores 1602A-N being one or more general purpose cores (e.g., general purpose in-order cores, general purpose out-of-order cores, a combination of the two); 2) a coprocessor with the cores 1602A-N being a large number of special purpose cores intended primarily for graphics and/or scientific (throughput); and 3) a coprocessor with the cores 1602A-N being a large number of general purpose in-order cores. Thus, the processor 1600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1600 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1606, and external memory (not shown) coupled to the set of integrated memory controller units 1614. The set of shared cache units 1606 may include one or more mid-level caches, such as level 2 (L2), level 3 (L3), level 4 (L4), or other levels of cache, a last level cache (LLC), and/or combinations thereof. While in one embodiment a ring based interconnect unit 1612 interconnects the integrated graphics logic 1608, the set of shared cache units 1606, and the system agent unit 1610/integrated memory controller unit(s) 1614, alternative embodiments may use any number of well-known techniques for interconnecting such units. In one embodiment, coherency is maintained between one or more cache units 1606 and cores 1602A-N.

In some embodiments, one or more of the cores 1602A-N are capable of multi-threading. The system agent 1610 includes those components coordinating and operating cores 1602A-N. The system agent unit 1610 may include for example a power control unit (PCU) and a display unit. The PCU may be or include logic and components needed for regulating the power state of the cores 1602A-N and the integrated graphics logic 1608. The display unit is for driving one or more externally connected displays.

The cores 1602A-N may be homogenous or heterogeneous in terms of architecture instruction set; that is, two or more of the cores 1602A-N may be capable of execution the same instruction set, while others may be capable of executing only a subset of that instruction set or a different instruction set.

Exemplary Computer Architectures

FIGS. 17-21 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 17:
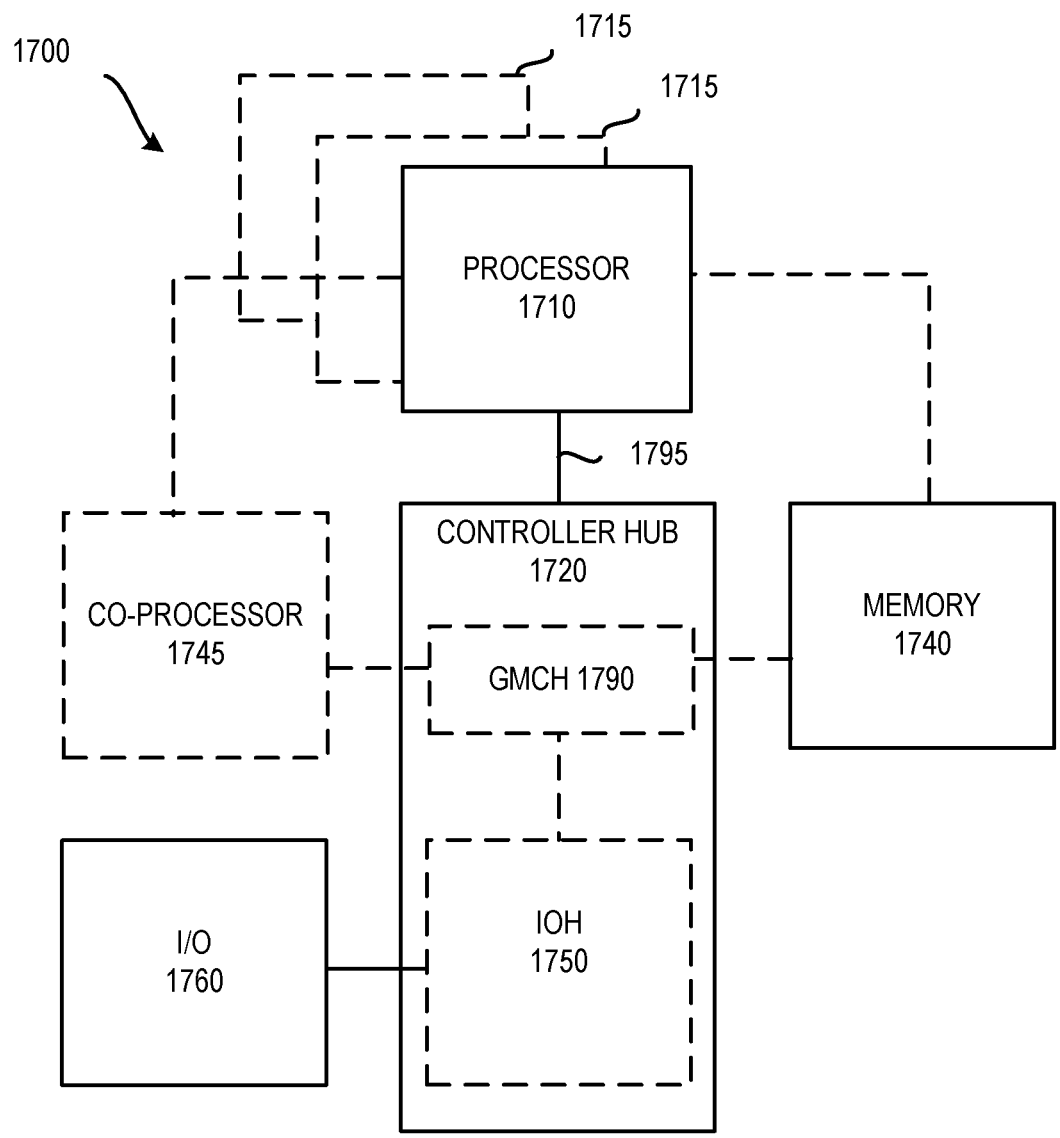
FIG. 17 is a block diagram of a first embodiment of a computer architecture.

Referring now to FIG. 17, shown is a block diagram of a system 1700 in accordance with one embodiment of the present invention. The system 1700 may include one or more processors 1710, 1715, which are coupled to a controller hub 1720. In one embodiment the controller hub 1720 includes a graphics memory controller hub (GMCH) 1790 and an Input/Output Hub (IOH) 1750 (which may be on separate chips); the GMCH 1790 includes memory and graphics controllers to which are coupled memory 1740 and a coprocessor 1745; the IOH 1750 is couples input/output (I/O) devices 1760 to the GMCH 1790. Alternatively, one or both of the memory and graphics controllers are integrated within the processor (as described herein), the memory 1740 and the coprocessor 1745 are coupled directly to the processor 1710, and the controller hub 1720 in a single chip with the IOH 1750.

The optional nature of additional processors 1715 is denoted in FIG. 17 with broken lines. Each processor 1710, 1715 may include one or more of the processing cores described herein and may be some version of the processor 1600.

The memory 1740 may be, for example, dynamic random access memory (DRAM), phase change memory (PCM), or a combination of the two. For at least one embodiment, the controller hub 1720 communicates with the processor(s) 1710, 1715 via a multi-drop bus, such as a frontside bus (FSB), point-to-point interface such as QuickPath Interconnect (QPI), or similar connection 1795.

In one embodiment, the coprocessor 1745 is a special-purpose processor, such as, for example, a high-throughput MIC processor, a network or communication processor, compression engine, graphics processor, GPGPU, embedded processor, or the like. In one embodiment, controller hub 1720 may include an integrated graphics accelerator.

There can be a variety of differences between the physical resources 1710, 1715 in terms of a spectrum of metrics of merit including architectural, microarchitectural, thermal, power consumption characteristics, and the like.

In one embodiment, the processor 1710 executes instructions that control data processing operations of a general type. Embedded within the instructions may be coprocessor instructions. The processor 1710 recognizes these coprocessor instructions as being of a type that should be executed by the attached coprocessor 1745. Accordingly, the processor 1710 issues these coprocessor instructions (or control signals representing coprocessor instructions) on a coprocessor bus or other interconnect, to coprocessor 1745. Coprocessor(s) 1745 accept and execute the received coprocessor instructions.

Figure 18:
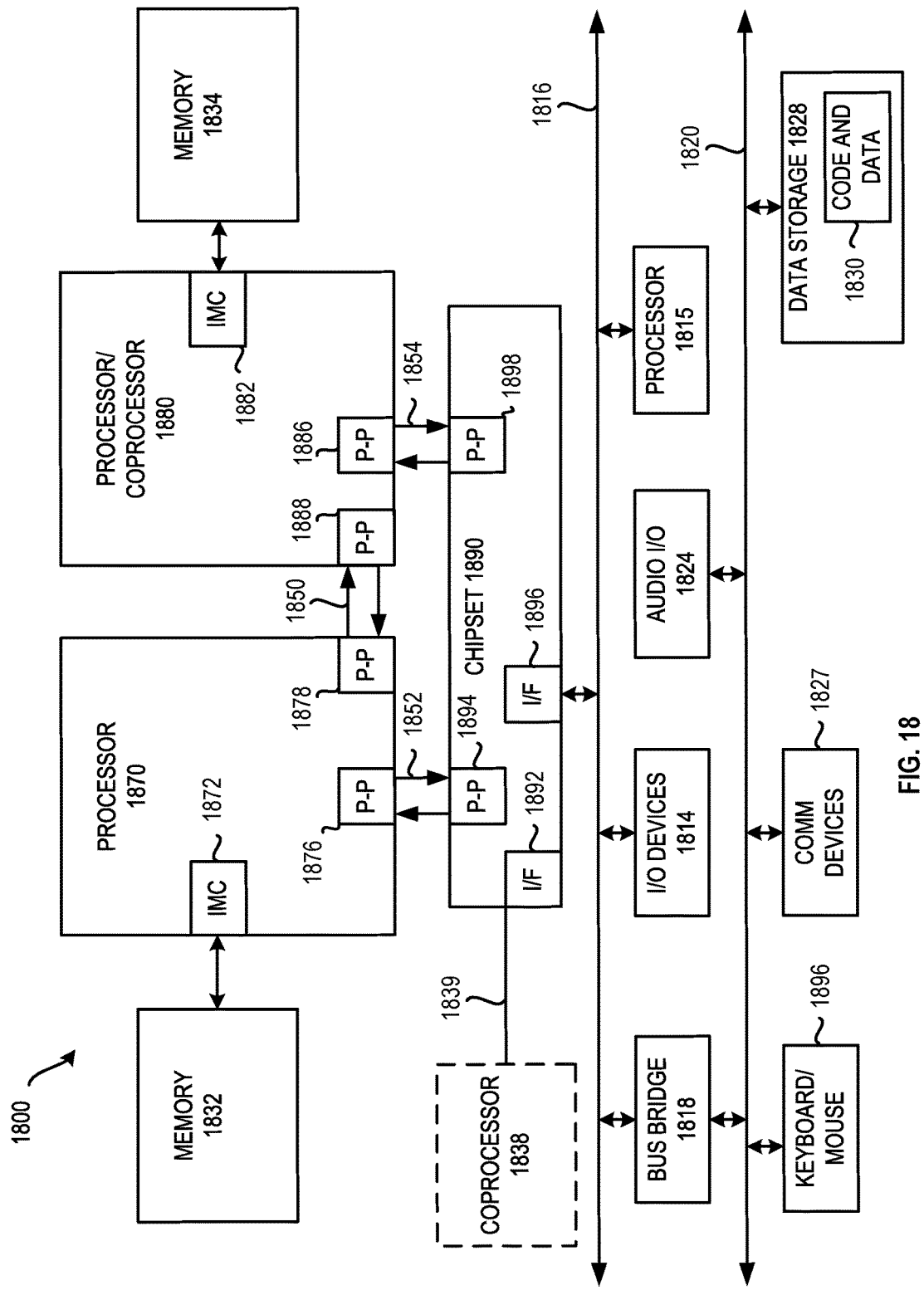
FIG. 18 is a block diagram of a second embodiment of a computer architecture.

Referring now to FIG. 18, shown is a block diagram of a first more specific exemplary system 1800 in accordance with an embodiment of the present invention. As shown in FIG. 18, multiprocessor system 1800 is a point-to-point interconnect system, and includes a first processor 1870 and a second processor 1880 coupled via a point-to-point interconnect 1850. Each of processors 1870 and 1880 may be some version of the processor 1600. In one embodiment of the invention, processors 1870 and 1880 are respectively processors 1710 and 1715, while coprocessor 1838 is coprocessor 1745. In another embodiment, processors 1870 and 1880 are respectively processor 1710 coprocessor 1745.

Processors 1870 and 1880 are shown including integrated memory controller (IMC) units 1872 and 1882, respectively. Processor 1870 also includes as part of its bus controller units point-to-point (P-P) interfaces 1876 and 1878; similarly, second processor 1880 includes P-P interfaces 1886 and 1888. Processors 1870, 1880 may exchange information via a point-to-point (P-P) interface 1850 using P-P interface circuits 1878, 1888. As shown in FIG. 18, IMCs 1872 and 1882 couple the processors to respective memories, namely a memory 1832 and a memory 1834, which may be portions of main memory locally attached to the respective processors.

Processors 1870, 1880 may each exchange information with a chipset 1890 via individual P-P interfaces 1852, 1854 using point to point interface circuits 1876, 1894, 1886, 1898. Chipset 1890 may optionally exchange information with the coprocessor 1838 via a high-performance interface 1839. In one embodiment, the coprocessor 1838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1890 may be coupled to a first bus 1816 via an interface 1896. In one embodiment, first bus 1816 may be a Peripheral Component Interconnect (PCI) bus, or a bus such as a PCI Express bus or another third generation I/O interconnect bus, although the scope of the present invention is not so limited.

As shown in FIG. 18, various I/O devices 1814 may be coupled to first bus 1816, along with a bus bridge 1818 which couples first bus 1816 to a second bus 1820. In one embodiment, one or more additional processor(s) 1815, such as coprocessors, high-throughput MIC processors, GPGPU's, accelerators (such as, e.g., graphics accelerators or digital signal processing (DSP) units), field programmable gate arrays, or any other processor, are coupled to first bus 1816. In one embodiment, second bus 1820 may be a low pin count (LPC) bus. Various devices may be coupled to a second bus 1820 including, for example, a keyboard and/or mouse 1822, communication devices 1827 and a storage unit 1828 such as a disk drive or other mass storage device which may include instructions/code and data 1830, in one embodiment. Further, an audio I/O 1824 may be coupled to the second bus 1820. Note that other architectures are possible. For example, instead of the point-to-point architecture of FIG. 18, a system may implement a multi-drop bus or other such architecture.

Figure 19:
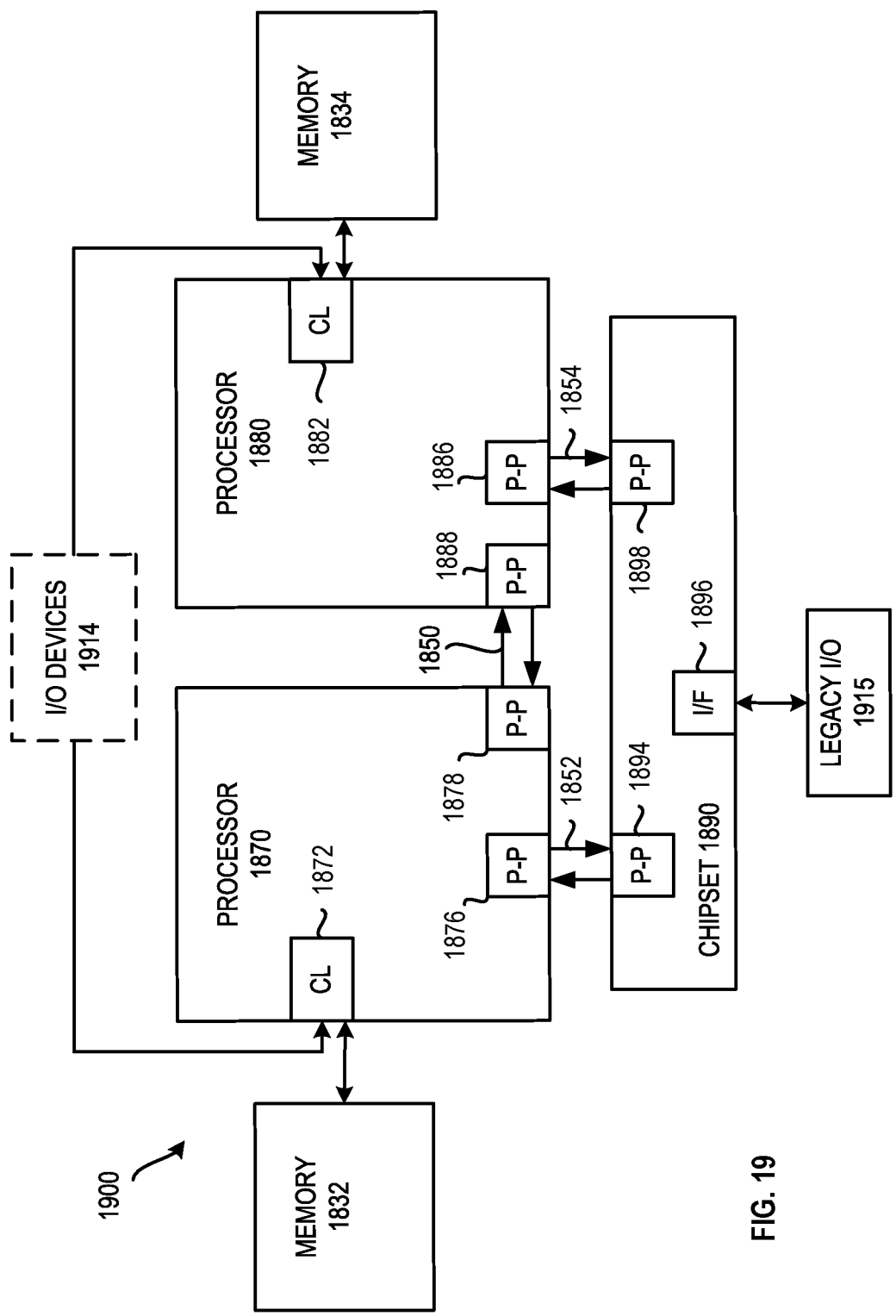
FIG. 19 is a block diagram of a third embodiment of a computer architecture.

Referring now to FIG. 19, shown is a block diagram of a second more specific exemplary system 1900 in accordance with an embodiment of the present invention. Like elements in FIGS. 18 and 19 bear like reference numerals, and certain aspects of FIG. 18 have been omitted from FIG. 19 in order to avoid obscuring other aspects of FIG. 19.

FIG. 19 illustrates that the processors 1870, 1880 may include integrated memory and I/O control logic ("CL") 1872 and 1882, respectively. Thus, the CL 1872, 1882 include integrated memory controller units and include I/O control logic. FIG. 19 illustrates that not only are the memories 1832, 1834 coupled to the CL 1872, 1882, but also that I/O devices 1914 are also coupled to the control logic 1872, 1882. Legacy I/O devices 1915 are coupled to the chipset 1890.

Figure 20:
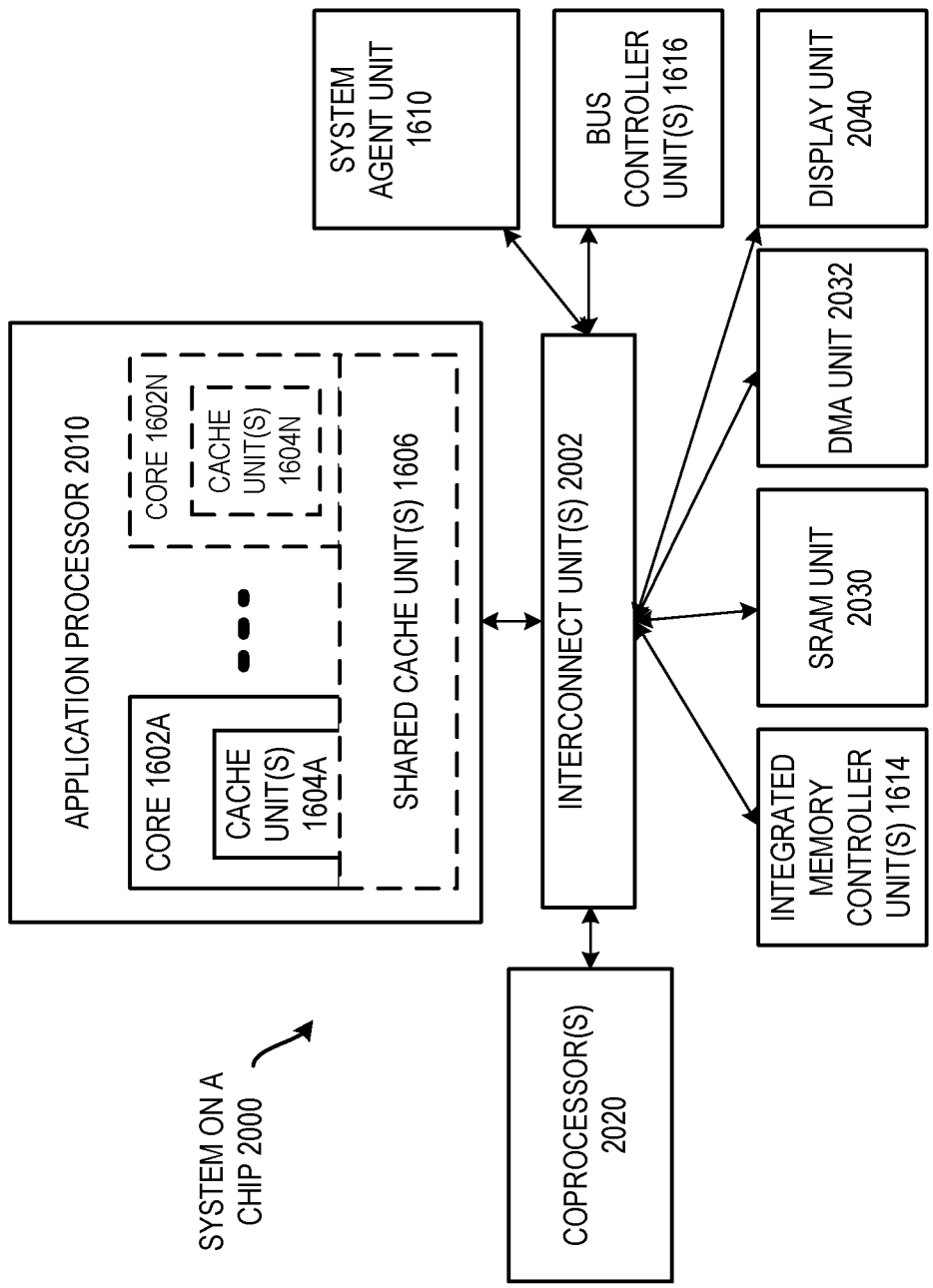
FIG. 20 is a block diagram of a fourth embodiment of a computer architecture.

Referring now to FIG. 20, shown is a block diagram of a SoC 2000 in accordance with an embodiment of the present invention. Similar elements in FIG. 16 bear like reference numerals. Also, dashed lined boxes are optional features on more advanced SoCs. In FIG. 20, an interconnect unit(s) 2002 is coupled to: an application processor 2010 which includes a set of one or more cores 192A-N and shared cache unit(s) 1606; a system agent unit 1610; a bus controller unit(s) 1616; an integrated memory controller unit(s) 1614; a set or one or more coprocessors 2020 which may include integrated graphics logic, an image processor, an audio processor, and a video processor; an static random access memory (SRAM) unit 2030; a direct memory access (DMA) unit 2032; and a display unit 2040 for coupling to one or more external displays. In one embodiment, the coprocessor(s) 2020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1830 illustrated in FIG. 18, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 21:
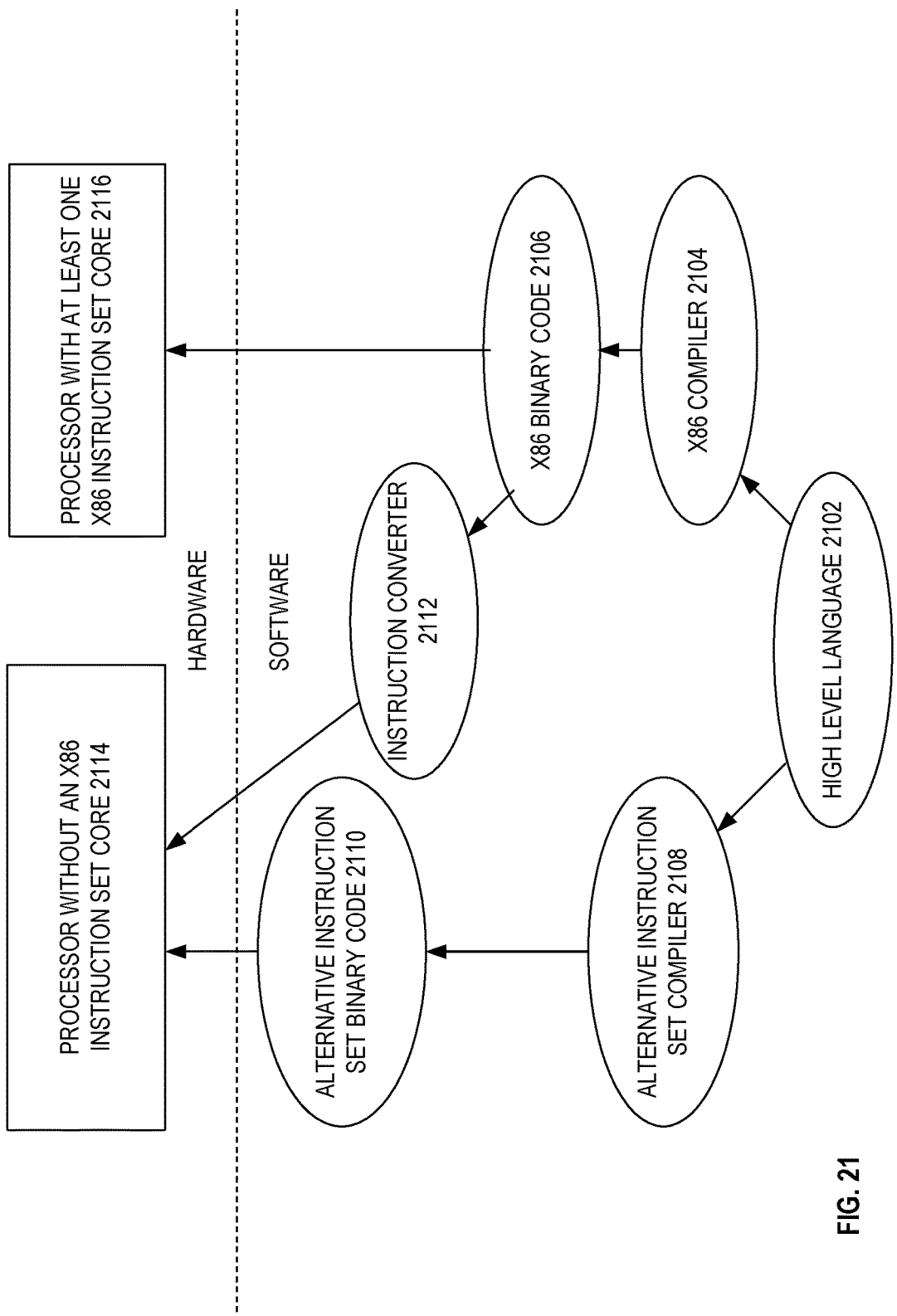
FIG. 21 is a block diagram of use of a software instruction converter to convert binary instructions in a source instruction set to binary instructions in a target instruction set, according to embodiments of the invention.

FIG. 21 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 21 shows a program in a high level language 2102 may be compiled using an x86 compiler 2104 to generate x86 binary code 2106 that may be natively executed by a processor with at least one x86 instruction set core 2116. The processor with at least one x86 instruction set core 2116 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2104 represents a compiler that is operable to generate x86 binary code 2106 (e.g., object code) that can, with or without additional linkage processing, be executed on the processor with at least one x86 instruction set core 2116. Similarly, FIG. 21 shows the program in the high level language 2102 may be compiled using an alternative instruction set compiler 2108 to generate alternative instruction set binary code 2110 that may be natively executed by a processor without at least one x86 instruction set core 2114 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2112 is used to convert the x86 binary code 2106 into code that may be natively executed by the processor without an x86 instruction set core 2114. This converted code is not likely to be the same as the alternative instruction set binary code 2110 because an instruction converter capable of this is difficult to make; however, the converted code will accomplish the general operation and be made up of instructions from the alternative instruction set. Thus, the instruction converter 2112 represents software, firmware, hardware, or a combination thereof that, through emulation, simulation or any other process, allows a processor or other electronic device that does not have an x86 instruction set processor or core to execute the x86 binary code 2106.

Components, features, and details described for any of FIGS. 3-7 and 9 may also optionally apply to any of FIGS. 1-2. Components, features, and details described for any of the processors disclosed herein may optionally apply to any of the methods disclosed herein, which in embodiments may optionally be performed by and/or with such processors. Any of the processors described herein in embodiments may optionally be included in any of the systems disclosed herein (e.g., any of the systems of FIGS. 17-20). In addition, any of the instructions disclosed herein may in some embodiments optionally have any of the features or details of the instruction formats shown herein (e.g., the formats described for FIGS. 10-12).

Processor components disclosed herein may be said and/or claimed to be operative, operable, capable, able, configured adapted, or otherwise to perform an operation. For example, a decoder may be said and/or claimed to decode an instruction, an execution unit may be said and/or claimed to store a result, or the like. As used herein, these expressions refer to the characteristics, properties, or attributes of the components when in a powered-off state, and do not imply that the components or the device or apparatus in which they are included is currently powered on or operating. For clarity, it is to be understood that the processors and apparatus claimed herein are not claimed as being powered on or running.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit through one or more intervening components. In the figures, arrows are used to show connections and couplings.

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Certain operations may be performed by hardware components, or may be embodied in machine-executable or circuit-executable instructions, that may be used to cause and/or result in a machine, circuit, or hardware component (e.g., a processor, portion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operative to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operative to cause the machine to perform and/or result in the machine performing one or operations, methods, or techniques disclosed herein.

In some embodiments, the machine-readable medium may include a tangible and/or non-transitory machine-readable storage medium. For example, the non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal. In some embodiments, the storage medium may include a tangible medium that includes solid-state matter or material, such as, for example, a semiconductor material, a phase change material, a magnetic solid material, a solid data storage material, etc. Alternatively, a non-tangible transitory computer-readable transmission media, such as, for example, an electrical, optical, acoustical or other form of propagated signals—such as carrier waves, infrared signals, and digital signals, may optionally be used.

Examples of suitable machines include, but are not limited to, a general-purpose processor, a special-purpose processor, a digital logic circuit, an integrated circuit, or the like. Still other examples of suitable machines include a computer system or other electronic device that includes a processor, a digital logic circuit, or an integrated circuit. Examples of such computer systems or electronic devices include, but are not limited to, desktop computers, laptop computers, notebook computers, tablet computers, netbooks, smartphones, cellular phones, servers, network devices (e.g., routers and switches.), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

EXAMPLE EMBODIMENTS

The following examples pertain to further embodiments. Specifics in the examples may be used anywhere in one or more embodiments.

Example 1 is a processor that includes a plurality of packed data registers, and a decode unit to decode an instruction. The instruction is to indicate a packed data register of the plurality of packed data registers that is to store a source packed memory address information. The source packed memory address information is to include a plurality of memory address information data elements. The processor also includes an execution unit coupled with the decode unit and the plurality of packed data registers. The execution unit, in response to the instruction, is to load a plurality of data elements from a plurality of memory addresses that are each to correspond to a different one of the plurality of memory address information data elements, and is to store the plurality of loaded data elements in a destination storage location. The destination storage location does not include a register of the plurality of packed data registers.

Example 2 includes the processor of Example 1, further including a cache, and in which the execution unit, in response to the instruction, is to non-temporally load the plurality of data elements including to not store the loaded data elements in any cache lines that would correspond to the plurality of memory addresses where the plurality of data elements where loaded from.

Example 3 includes the processor of any one of Examples 1 to 2, in which the decode unit is to decode the instruction that is to indicate a destination memory address information that is to correspond to the destination storage location.

Example 4 includes the processor of any one of Examples 1 to 3, further including a cache, and in which the execution unit, in response to the instruction, is to store the plurality of loaded data elements in the destination storage location which is to be a cache line in the cache.

Example 5 includes the processor of Example 4, further including a level one (L1) cache, in which the decode unit is to decode the instruction that is to implicitly indicate the cache, and in which the cache is not the L1 cache.

Example 6 includes the processor of Example 4, in which the decode unit is to decode the instruction that is to have a field to explicitly specify the cache.

Example 7 includes the processor of any one of Examples 1 to 6, in which the execution unit, in response to the instruction, is to configure the cache line to be unreadable and unevictable until the plurality of data elements have been loaded.

Example 8 includes the processor of Example 1, in which the execution unit, in response to the instruction, is to store the plurality of loaded data elements in the destination storage location which is to be a memory location in a memory.

Example 9 includes the processor of any one of Examples 1 to 8, in which the execution unit, in response to the instruction, is to load each of the plurality of data elements from a memory as an individual data element without any additional neighboring data elements being loaded.

Example 10 includes the processor of any one of Examples 1 to 9, further including a concurrent load operation dispatch unit, the concurrent load operation dispatch unit to concurrently dispatch at least two load operations for at least two of the plurality of data elements.

Example 11 includes the processor of Example 10, in which the processor includes a plurality of cores, in which the concurrent load operation dispatch unit corresponds to a first core of the plurality of cores, and further including a different concurrent load operation dispatch unit for each of the plurality of cores.

Example 12 includes the processor of any one of Examples 1 to 11, further including a banked translation lookaside buffer (TLB). The banked TLB having a plurality of TLB banks, the plurality of TLB banks to concurrently translate a plurality of logical addresses to a plurality of physical addresses.

Example 13 includes the processor of Example 12, in which each of the TLB banks is to be mapped to a different set of logical addresses.

Example 14 includes the processor of any one of Examples 1 to 13, further including a store queue to queue operations, and an extended store queue to queue operations including an operation that is to correspond to the instruction, and in which the operations that are to be queued in the extended store queue are to be committed in order with respect to the operations that are to be queued in the store queue.

Example 15 includes the processor of Example 14, in which the store queue is to support store to load forwarding, and in which the extended store queue is not to support store to load forwarding.

Example 16 is a method performed by a processor that includes receiving an instruction at the processor. The instruction indicates a packed data register that stores a source packed memory address information. The source packed memory address information includes a plurality of memory address information data elements. The method includes loading a plurality of data elements from a plurality of memory addresses that each correspond to a different one of the plurality of memory address information data elements in response to the instruction, and storing the plurality of loaded data elements in a destination storage location in response to the instruction. The destination storage location does not include a packed data register.

Example 17 includes the method of Example 16, in which said loading includes non-temporally loading the plurality of data elements including not storing the loaded data elements in any cache lines that would correspond to the plurality of memory addresses from where the plurality of data elements where loaded from.

Example 18 includes the method of any one of Examples 16 to 17, in which said receiving includes receiving the instruction that indicates a destination memory address information that corresponds to the destination storage location.

Example 19 includes the method of any one of Examples 16 to 18, in which said storing includes storing the plurality of loaded data elements in the destination storage location which is a cache line in a cache.

Example 20 includes the method of Example 19, in which said receiving includes receiving the instruction that implicitly indicates the cache which is not the L1 cache.

Example 21 is a system to process instructions that includes a bus or other interconnect, and a processor coupled with the interconnect. The processor is to receive an instruction. The instruction is to indicate a packed data register that is to store a source packed memory address information. The source packed memory address information is to include a plurality of memory address information data elements. The processor, in response to the instruction, is to load a plurality of data elements from a plurality of memory addresses that are each to correspond to a different one of the plurality of memory address information data elements, and is to store the plurality of loaded data elements in a destination storage location. The destination storage location does not include a register of the plurality of packed data registers, and a memory coupled with the interconnect.

Example 22 includes the system of Example 21, in which the processor includes a cache, and in which the processor, in response to the instruction, is to non-temporally load the plurality of data elements including to not store the loaded data elements in any cache lines that would correspond to the plurality of memory addresses where the plurality of data elements where loaded from.

Example 23 is an article of manufacture including a non-transitory machine-readable storage medium. The non-transitory machine-readable storage medium storing a plurality of instructions including an instruction. The instruction, if performed by a machine, is to cause the machine to perform operations including access a source packed memory address information from a packed data register that is to be indicated by the instruction. The source packed memory address information to include a plurality of memory address information data elements. The operations also include to load a plurality of data elements from a plurality of memory addresses that are each to correspond to a different one of the plurality of memory address information data elements. The operations also include to store the plurality of loaded data elements in a destination storage location. The destination storage location does not include a packed data register.

Example 24 includes the article of manufacture of Example 23, in which the instruction, if performed by the machine, is to cause the machine to perform operations including non-temporally load the plurality of data elements including to not store the loaded data elements in any cache lines that would correspond to the plurality of memory addresses where the plurality of data elements where loaded from.

Example 25 includes a processor that includes at least one cache, a plurality of packed data registers, and a decode unit to decode an instruction. The instruction is to indicate a source memory address information. The processor also includes an execution unit coupled with the decode unit. The execution unit, in response to the instruction, is to non-temporally load a data element from a source memory address that corresponds to the memory address information including to not store the loaded data element in any cache lines of the at least one cache that would correspond to the source memory address where the data element was loaded from, and store the loaded data element in a destination cache line in the at least one cache.

Example 26 includes the processor of any one of Examples 1 to 15 and 25, further including an optional branch prediction unit to predict branches, and an optional instruction prefetch unit, coupled with the branch prediction unit, the instruction prefetch unit to prefetch instructions including the instruction. The processor may also optionally include an optional level 1 (L1) instruction cache coupled with the instruction prefetch unit, the L1 instruction cache to store instructions including the instruction, an optional L1 data cache to store data, and an optional level 2 (L2) cache to store data and instructions. The processor may also optionally include an instruction fetch unit coupled with the decode unit, the L1 instruction cache, and the L2 cache, to fetch the instruction, in some cases from one of the L1 instruction cache and the L2 cache, and to provide the instruction to the decode unit. The processor may also optionally include a register rename unit to rename registers, and an optional commit unit to commit the instruction.

Example 27 includes a system-on-chip that includes at least one interconnect, the processor of any one of Examples 1 to 15 and 25 coupled with the at least one interconnect, an optional graphics processing unit (GPU) coupled with the at least one interconnect, an optional digital signal processor (DSP) coupled with the at least one interconnect, an optional display controller coupled with the at least one interconnect, an optional memory controller coupled with the at least one interconnect, an optional wireless modem coupled with the at least one interconnect, an optional image signal processor coupled with the at least one interconnect, an optional Universal Serial Bus (USB) 3.0 compatible controller coupled with the at least one interconnect, an optional Bluetooth 4.1 compatible controller coupled with the at least one interconnect, and an optional wireless transceiver controller coupled with the at least one interconnect.

Example 28 is a processor or other apparatus operative to perform the method of any one of Examples 16 to 19.

Example 29 is a processor or other apparatus that includes means for performing the method of any one of Examples 16 to 19.

Example 30 is an optionally non-transitory and/or tangible machine-readable medium, which optionally stores or otherwise provides instructions including a first instruction, the first instruction if and/or when executed by a processor, computer system, electronic device, or other machine, is operative to cause the machine to perform the method of any one of Examples 16 to 19.

Example 31 is a processor or other apparatus substantially as described herein.

Example 32 is a processor or other apparatus that is operative to perform any method substantially as described herein.

Example 33 is a processor or other apparatus that is operative to perform any load instruction substantially as described herein.

Example 34 is a processor that includes means for storing packed data, and means for decoding an instruction. The instruction to indicate a packed data register of the plurality of packed data registers that is to store a source packed memory address information. The source packed memory address information to include a plurality of memory address information data elements. The processor also includes means, in response to the instruction, for loading a plurality of data elements from a plurality of memory addresses that are each to correspond to a different one of the plurality of memory address information data elements. The processor also includes means, in response to the instruction, for storing the plurality of loaded data elements in a destination storage location. The destination storage location does not include a register of the plurality of packed data registers.

What is claimed is:

1. A processor comprising:
a plurality of packed data registers;
a decode unit to decode an instruction, the instruction to indicate a packed data register of the plurality of packed data registers that is to store a source packed memory address information, the source packed memory address information to include a plurality of memory address information data elements, and the instruction to indicate a single destination memory address; and
an execution unit coupled with the decode unit and coupled with the plurality of packed data registers, the execution unit, in response to the decode of the instruction, to:
load a plurality of data elements from a plurality of memory addresses that are each to correspond to a different one of the plurality of memory address information data elements; and
store the plurality of loaded data elements contiguously in a destination storage location corresponding to the single destination memory address.

2. The processor of claim 1, further comprising a cache, and wherein the execution unit, in response to the instruction, is to non-temporally load the plurality of data elements, in which the non-temporally loaded data elements are not to be cached in any cache lines that correspond to the plurality of memory address information data elements.

3. The processor of claim 1, further comprising a given cache, and wherein the execution unit, in response to the instruction, is to store the plurality of loaded data elements in the destination storage location which is to be a cache line in the given cache that corresponds to the single destination memory address.

4. The processor of claim 3, further comprising a level one (L1) cache, wherein the decode unit is to decode the instruction that is to implicitly indicate the given cache, and wherein the given cache is not the L1 cache.

5. The processor of claim 3, wherein the decode unit is to decode the instruction that is to have a field to explicitly specify the given cache.

6. The processor of claim 3, wherein the execution unit, in response to the instruction, is to configure the cache line to be unreadable and unevictable until the plurality of data elements have been loaded.

7. The processor of claim 1, wherein the execution unit, in response to the instruction, is to load each of the plurality of data elements from a memory as an individual data element without any additional neighboring data elements being loaded.

8. The processor of claim 1, further comprising a concurrent load operation dispatch unit, the concurrent load operation dispatch unit to concurrently dispatch at least two load operations for at least two of the plurality of data elements.

9. The processor of claim 8, wherein the processor comprises a plurality of cores, wherein the concurrent load operation dispatch unit corresponds to a first core of the plurality of cores, and further comprising a different concurrent load operation dispatch unit for each of the plurality of cores.

10. The processor of claim 1, further comprising a banked translation lookaside buffer (TLB), the banked TLB having a plurality of TLB banks, the plurality of TLB banks to concurrently translate a plurality of logical addresses to a plurality of physical addresses.

11. The processor of claim 10, wherein each of the TLB banks is to be mapped to a different set of logical addresses.

12. The processor of claim 1, further comprising:
a store queue to queue operations; and
an extended store queue to queue operations including an operation that is to correspond to the instruction, and wherein the operations that are to be queued in the extended store queue are to be committed in order with respect to the operations that are to be queued in the store queue.

13. The processor of claim 12, wherein the store queue is to support store to load forwarding, and wherein the extended store queue is not to support store to load forwarding.

14. A method performed by a processor comprising:
receiving an instruction at the processor, the instruction indicating a packed data register that stores a source packed memory address information, the source packed memory address information including a plurality of memory address information data elements, and the instruction indicating a single destination memory address;
loading a plurality of data elements from a plurality of memory addresses that each correspond to a different one of the plurality of memory address information data elements in response to the instruction; and
storing the plurality of loaded data elements contiguously in a destination storage location, which corresponds to the single destination memory address, in response to the instruction.

15. The method of claim 14, wherein said loading comprises non-temporally loading the plurality of data elements, in which the non-temporally loaded data elements are not cached in any cache lines that corresponding to the plurality of memory address information data elements.

16. The method of claim 14, wherein said receiving comprises receiving the instruction that indicates a single destination memory address information that corresponds to the single destination memory address.

17. The method of claim 14, wherein said storing comprises storing the plurality of loaded data elements in the destination storage location which is a cache line in a cache.

18. The method of claim 17, wherein said receiving comprises receiving the instruction that implicitly indicates the cache which is not the L1 cache.

19. A system to process instructions comprising:
an interconnect;
a processor coupled with the interconnect, the processor to receive an instruction, the instruction to indicate a packed data register that is to store a source packed memory address information, the source packed memory address information to include a plurality of memory address information data elements, and the instruction to indicate a scalar register that is to store a single destination memory address information, the processor, in response to the instruction, to load a plurality of data elements from a plurality of memory addresses that are each to correspond to a different one of the plurality of memory address information data elements, and store the plurality of loaded data elements contiguously in a destination storage location, wherein the destination storage location does not include a packed data register, and wherein the destination storage location corresponds to the single destination memory address information; and
a memory coupled with the interconnect.

20. The system of claim 19, wherein the processor comprises a cache, and wherein the processor, in response to the instruction, is to non-temporally load the plurality of data elements, in which the non-temporally loaded data elements are not to be cached in any cache lines that would correspond to the plurality of memory addresses where the plurality of data elements where loaded from.

21. An article of manufacture comprising a non-transitory machine-readable storage medium, the non-transitory machine-readable storage medium storing a plurality of instructions including an instruction, the instruction, if performed by a machine, is to cause the machine to perform operations comprising:
access a source packed memory address information from a packed data register that is to be indicated by the instruction, the source packed memory address information to include a plurality of memory address information data elements;
generate a single destination memory address from a single destination memory address information to be accessed from a general-purpose register to be indicated by the instruction;
load a plurality of data elements from a plurality of memory addresses that are each to correspond to a different one of the plurality of memory address information data elements; and
store the plurality of loaded data elements contiguously in a destination storage location that corresponds to the single destination memory address.

22. The article of manufacture of claim 21, wherein the instruction, if performed by the machine, is to cause the machine to perform operations comprising:
non-temporally load the plurality of data elements in which the non-temporally loaded data elements are not to be cached in any cache lines that would correspond to the plurality of memory addresses where the plurality of data elements where loaded from.

23. A processor comprising:
at least one cache;
a plurality of packed data registers;
a decode unit to decode an instruction, the instruction to indicate a source memory address information, and the instruction to indicate a destination memory address information; and
an execution unit coupled with the decode unit, the execution unit, in response to the instruction, to:
non-temporally load a data element from a source memory address that corresponds to the memory address information, in which the loaded data element is not to be cached in any cache lines of the at least one cache that correspond to the source memory address for the data element; and
cache the loaded data element in a cache line in the at least one cache, wherein the cache line corresponds to the destination memory address information.

* * * * *